(12) United States Patent
Jang et al.

(10) Patent No.: US 12,501,249 B2
(45) Date of Patent: Dec. 16, 2025

(54) ELECTRONIC DEVICE FOR TRANSMITTING AND RECEIVING NETWORK CONFIGURATION INFORMATION AND OPERATING METHOD THEREOF

(71) Applicant: Samsung Electronics Co., Ltd., Suwon-si (KR)

(72) Inventors: Wonjun Jang, Suwon-si (KR); Buseop Jung, Suwon-si (KR); Beomjip Kim, Suwon-si (KR); Hakkwan Kim, Suwon-si (KR); Hyejung Bang, Suwon-si (KR); Dooho Lee, Suwon-si (KR); Sunkey Lee, Suwon-si (KR); Soonho Lee, Suwon-si (KR); Namju Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 17/665,020

(22) Filed: Feb. 4, 2022

(65) Prior Publication Data

US 2022/0256327 A1 Aug. 11, 2022

Related U.S. Application Data

(63) Continuation of application No. PCT/KR2022/001609, filed on Jan. 28, 2022.

(30) Foreign Application Priority Data

Feb. 4, 2021 (KR) .................. 10-2021-0016214

(51) Int. Cl.
*H04W 12/06* (2021.01)
*H04W 8/00* (2009.01)
*H04W 76/15* (2018.01)

(52) U.S. Cl.
CPC ........... *H04W 8/005* (2013.01); *H04W 12/06* (2013.01); *H04W 76/15* (2018.02)

(58) Field of Classification Search
CPC ....... H04W 8/00; H04W 12/06; H04W 76/15; H04W 24/02; H04W 84/12; H04W 4/50; H04W 48/16; H04W 8/005
See application file for complete search history.

(56) References Cited

U.S. PATENT DOCUMENTS

2008/0133723 A1* 6/2008 Lee ...................... H04L 67/104
709/222
2010/0103837 A1 4/2010 Jungck et al.
(Continued)

FOREIGN PATENT DOCUMENTS

CN 112135333 A1 12/2020
KR 10-2017-0043531 A 4/2017
(Continued)

OTHER PUBLICATIONS

Extended European Search Report dated Aug. 29, 2023, issued in European Patent Application No. 22701147.5.
(Continued)

*Primary Examiner* — Atique Ahmed
(74) *Attorney, Agent, or Firm* — Jefferson IP Law, LLP

(57) ABSTRACT

An electronic device is provided. The electronic device includes a communication circuit and at least one processor, and the at least one processor may be configured to receive, from an external electronic device via the communication circuit, a first message requesting network configuration information, select at least one network configuration information to be transmitted to the external electronic device among a plurality of network configuration information stored in the electronic device based on a set filtering scheme, and transmit, to the external electronic device via (Continued)

the communication circuit, a second message including the selected at least one network configuration information.

18 Claims, 14 Drawing Sheets

(56) References Cited

U.S. PATENT DOCUMENTS

| | | | |
|---|---|---|---|
| 2014/0003262 A1* | 1/2014 | He | H04W 52/0245 |
| | | | 370/252 |
| 2014/0199969 A1* | 7/2014 | Johnsson | H04W 12/0431 |
| | | | 455/411 |
| 2016/0050565 A1 | 2/2016 | Benoit et al. | |
| 2016/0165645 A1 | 6/2016 | Commons et al. | |
| 2016/0345297 A1* | 11/2016 | Chen | H04W 72/02 |
| 2017/0134935 A1* | 5/2017 | Wei | H04W 76/14 |
| 2018/0109418 A1* | 4/2018 | Cammarota | H04W 12/50 |
| 2019/0123964 A1 | 4/2019 | Lepp et al. | |
| 2019/0306710 A1 | 10/2019 | Cammarota et al. | |
| 2019/0332774 A1 | 10/2019 | Nix | |
| 2019/0356482 A1 | 11/2019 | Nix | |
| 2020/0092685 A1* | 3/2020 | Fehrenbach | H04W 36/08 |
| 2020/0221296 A1 | 7/2020 | Jiang et al. | |
| 2020/0226258 A1 | 7/2020 | Nix | |
| 2020/0413403 A1 | 12/2020 | Umehara | |
| 2021/0211423 A1* | 7/2021 | Tan | H04W 12/71 |
| 2021/0243825 A1 | 8/2021 | Takada | |
| 2021/0282013 A1* | 9/2021 | Jiang | H04L 63/0869 |
| 2021/0344044 A1 | 11/2021 | Lee et al. | |
| 2021/0385778 A1 | 12/2021 | Ahn et al. | |
| 2022/0294623 A1* | 9/2022 | Yu | H04L 9/0869 |

FOREIGN PATENT DOCUMENTS

| | | |
|---|---|---|
| WO | 2019/177231 A1 | 9/2019 |
| WO | 2020-080805 A1 | 4/2020 |
| WO | 2020/092971 A1 | 5/2020 |

OTHER PUBLICATIONS

Wi-Fi Easy Connect Speciication Version 2.0.XP 055768216, Dec. 14, 2020.
International Search Report dated May 4, 2022, issued in International Application No. PCT/KR2022/001609.
Korean Office Action dated on May 8, 2025, issued in Korean Application No. 10-2021-0016214.

* cited by examiner

ELECTRONIC DEVICE FOR TRANSMITTING AND RECEIVING NETWORK CONFIGURATION INFORMATION AND OPERATING METHOD THEREOF

CROSS-REFERENCE TO RELATED APPLICATION(S)

This application is a continuation application, claiming priority under § 365(c), of an International application No. PCT/KR2022/001609, filed on Jan. 28, 2022, which is based on and claims the benefit of a Korean patent application number 10-2021-0016214, filed on Feb. 4, 2021, in the Korean Intellectual Property Office, the disclosure of which is incorporated by reference herein in its entirety.

TECHNICAL FIELD

The disclosure relates to an electronic device for transmitting and receiving network configuration information and an operating method thereof.

BACKGROUND ART

A wireless communication system is being developed widely in order to provide various types of communication services, such as voice or data. Generally, the wireless communication system is a Multiple Access (MA) system which is capable of supporting a communication with a plurality of electronic devices by sharing available system resources (e.g., a frequency resource, a bandwidth resource, or an output power resource). MA systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system.

Various wireless communication technologies are being developed along with the development of an information communication technology. Specially, a Wireless Local Area Network (WLAN) technology is technology which may allow an access to Internet in a wireless manner at a home, an office, or a specific service provision area by using an electronic device, such as a smart phone, a Personal Digital Assistant (PDA), or a laptop computer based on a wireless frequency technology.

In order to secure flexibility of a communication between devices in a WLAN system, various protocols have been proposed for a direct communication between devices without intervention of a management entity, such as a Base Station (BS) or an Access Point (AP). Specially, Wi-Fi Alliance (WFA) which is based on a Wi-Fi standard has developed a Device Provisioning Protocol (DPP) capable of simply and efficiently connecting a Wi-Fi device which does not have a User Interface (UI) or has a limited UI to a Wi-Fi network.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

In a device provisioning protocol (DPP) technology which has been standardized by wi-fi alliance (WFA) based on a Wi-Fi standard among wireless communication technologies, a case in which a plurality of access point (APs) exist and each of the plurality of APs has unique connection information has been considered.

In this case, there may be a need for a configurator to transmit connection information for the plurality of APs to an enrollee, e.g., an enrollee client. However, the current DPP technology does not specify how to provide connection information for a plurality of APs if the connection information for the plurality of APs exists.

In addition, the DPP technology specifies that a configurator provides connection information for an AP to an enrollee client, but does not specify that the connection information for the AP provided to the enrollee client is specifically connection information for which AP.

Aspects of the disclosure are to address at least the above-mentioned problems and/or disadvantages and to provide at least the advantages described below. Accordingly, an aspect of the disclosure is to provide an electronic device for transmitting and receiving network configuration information and an operating method thereof.

Another aspect of the disclosure is to provide an electronic device for transmitting and receiving a plurality of network configuration information and an operating method thereof in a DPP network.

Another aspect of the disclosure is to provide an electronic device for transmitting and receiving network configuration information suitable for an enrollee and an operating method thereof in a DPP network.

Another aspect of the disclosure is to provide an electronic device for providing a condition for filtering network configuration information to be provided and an operating method thereof in a DPP network.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication circuit and at least one processor, and the at least one processor may be configured to receive, from an external electronic device via the communication circuit, a first message requesting network configuration information, select at least one network configuration information to be transmitted to the external electronic device among a plurality of network configuration information stored in the electronic device based on a set filtering scheme, and transmit, to the external electronic device via the communication circuit, a second message including the selected at least one network configuration information.

In accordance with another aspect of the disclosure, an electronic device is provided. The electronic device includes a communication circuit and at least one processor, and the at least one processor may be configured to perform, via the communication circuit, an authentication operation based on secure information with an external electronic device, transmit, to the external electronic device via the communication circuit, a first message requesting network configuration information, and receive, from the external electronic device via the communication circuit, a second message including at least one network configuration information which is selected among a plurality of network configuration information stored in the external electronic device based on a set filtering scheme.

In accordance with another aspect of the disclosure, a method performed by an electronic device is provided. The method includes receiving, from an external electronic device, a first message requesting network configuration information, selecting at least one network configuration information to be transmitted to the external electronic device among a plurality of network configuration information stored in the electronic device based on a set filtering scheme, and transmitting, to the external electronic device, a second message including the selected at least one network configuration information.

In accordance with another aspect of the disclosure, a method performed by an electronic device is provided The method includes performing authentication operation based on secure information with an external electronic device, transmitting, to the external electronic device, a first message requesting network configuration information, and receiving, from the external electronic device, a second message including at least one network configuration information which is selected among a plurality of network configuration information stored in the external electronic device based on a set filtering scheme.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
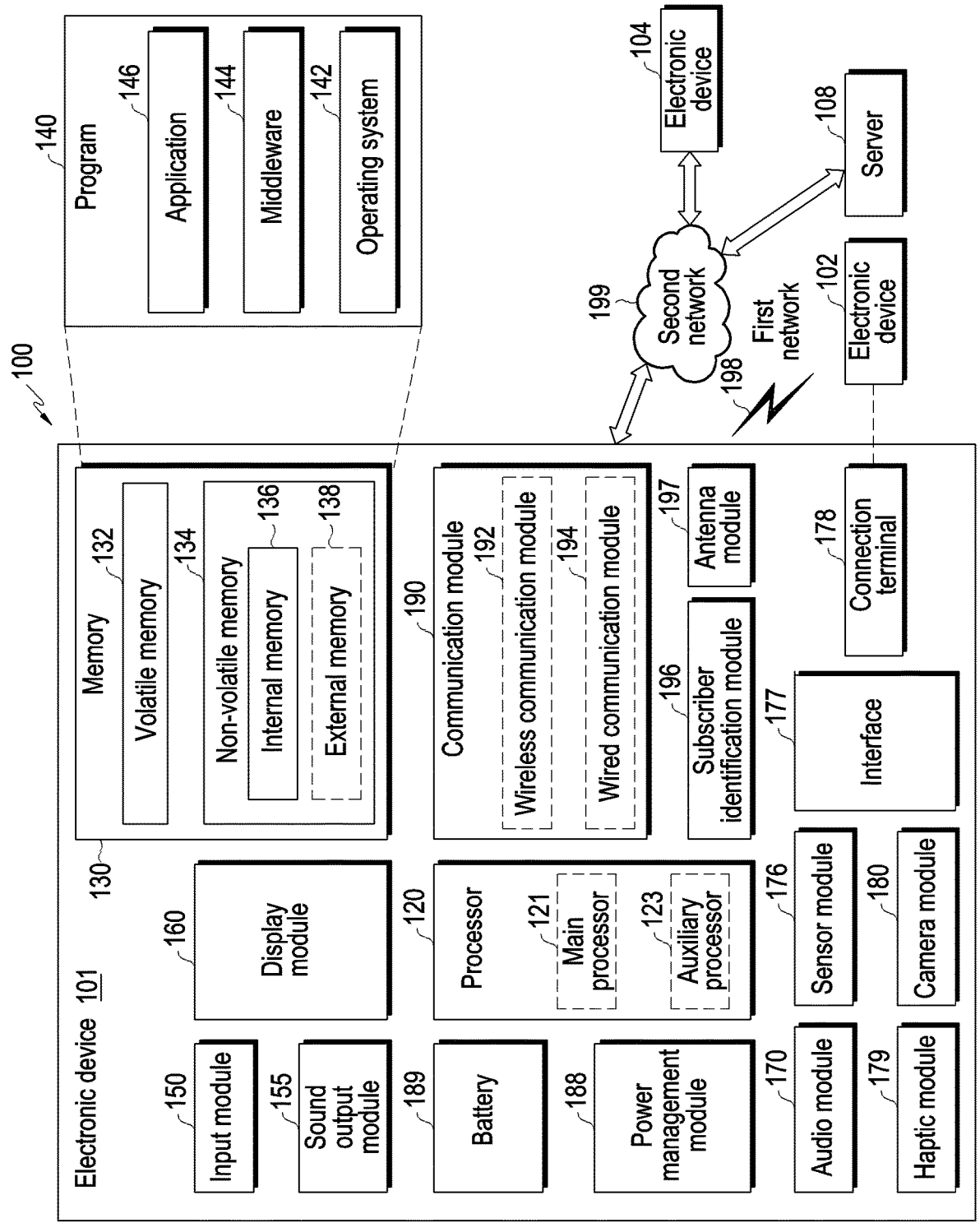
FIG. 1 is a block diagram illustrating an electronic device within a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be noted that the technical terms used herein are only used to describe specific embodiments, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

As used herein, such an expression as "comprises" or "include", or the like should not be interpreted to necessarily include all elements or all operations described in the specification, and should be interpreted to be allowed to exclude some of them or further include additional elements or operations.

Alternatively, the terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, various embodiments of the disclosure will be described with reference to the accompanying drawings. Regardless of drawing signs, the same or like elements are provided with the same reference numeral, and a repeated description thereof will be omitted. Alternatively, in describing various embodiments of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

Hereinafter, a terminal will be described in various embodiments of the disclosure, but the terminal may be referred to as an electronic device, a mobile station, a mobile equipment (ME), a user equipment (UE), a user terminal (UT), a subscriber station (SS), a wireless device, a handheld device, and an access terminal (AT). Alternatively, in various embodiments of the disclosure, the terminal may be a device having a communication function, such as, for example, a mobile phone, a personal digital assistant (PDA), a smart phone, a wireless MODEM, and a notebook.

In a detailed description of various embodiments of the disclosure, standards provided by institute of electrical and electronics engineers (IEEE) which is a wireless access standardization organization and Wi-Fi alliance (WFA) are referred to, but the main subject of the disclosure can be somewhat modified and applied to other communication systems having a similar technical background without departing from the scope of the disclosure, and the modifications can be made based on determination of those skilled in the art.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., an electronic device 102, a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Meanwhile, WFA has proposed a device provisioning protocol (DPP) based on a Wi-Fi technology, and the DPP is a protocol capable of simply and efficiently connecting a Wi-Fi device which does not have a user interface (UI) or has a limited UI to a Wi-Fi network.

Figure 2:
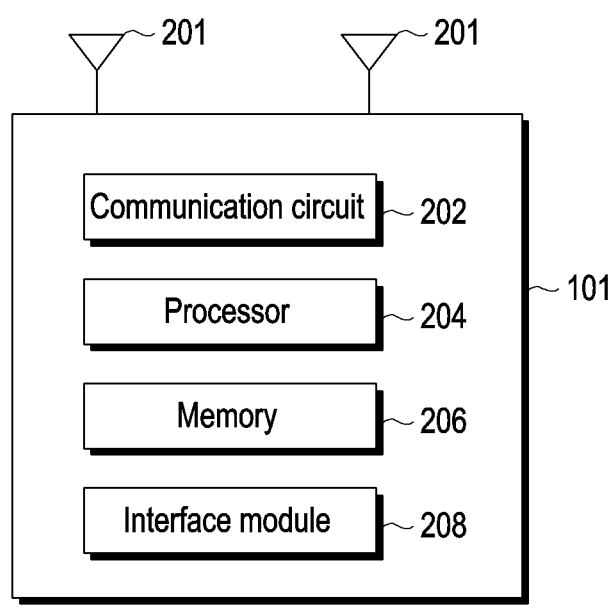
FIG. 2 is a block diagram of an electronic device according to an embodiment of the disclosure.

FIG. 2 is a block diagram of an electronic device 101 according to an embodiment of the disclosure.

Referring to FIG. 2, an electronic device (e.g., an electronic device 101 in FIG. 1) may be a device implementing a DPP. Hereinafter, for convenience of a description, the device implementing the DPP will be referred to as a DPP device.

The electronic device 101 may include a communication circuit 202 (e.g., a communication module 190 in FIG. 1) which transmits and receives signals with an external electronic device (e.g., an electronic device 102 or 104 in FIG. 1), for example, a peer device by using one or more antennas 201.

The electronic device 101 may include at least one processor 204 (e.g., a processor 120 in FIG. 1) which may be implemented in one or more single-core processors or one or more multi-core processors, and a memory 206 (e.g., a memory 130 in FIG. 1) which stores instructions for an operation of the electronic device 101.

The electronic device 101 may include an interface module 208 (e.g., an interface 177 in FIG. 1) which provides a wired and/or wireless interface for communicating with components outside a network. At least a portion of the one or more antennas 201, the communication circuit 202, or the interface module 208 may be implemented as, for example, at least a portion of the communication module 190 and the antenna module 198 in FIG. 1.

According to various embodiments of the disclosure, an electronic device (e.g., an electronic device 101 in FIG. 1) may comprise a communication circuit (e.g., a communication circuit 202 in FIG. 2) and at least one processor (e.g., a processor in FIG. 2). The at least one processor 204 may be configured to: receive, from an external electronic device (e.g., an electronic device 102 or an electronic device 104 in FIG. 1) via the communication circuit 202, a first message requesting network configuration information, select at least one network configuration information to be transmitted to the external electronic device 101 or 102 among a plurality of network configuration information stored in the electronic device 101 based on a set filtering scheme, and transmit, to the external electronic device 102 or 104 via the communication circuit 202, a second message including the selected at least one network configuration information. In an embodiment of the disclosure, the network configuration information may be a DPP configuration object. In an embodiment of the disclosure, the first message requesting the network configuration information may be a DPP configuration request frame. In an embodiment of the disclosure, the second message including the at least one network configuration information selected by the electronic device 101 may be a DPP configuration response frame.

According to various embodiments of the disclosure, the filtering scheme may include at least one of a filtering scheme which is based on a scan result of the electronic device 101, or a filtering scheme which is based on a scan result of the external electronic device 102 or 104. In an embodiment of the disclosure, the filtering scheme which is based on the scan result of the electronic device 101 may be a configurator-based Wi-Fi scan filtering scheme, and the filtering scheme which is based on the scan result of the external electronic device 102 or 104 may be an enrollee-based Wi-Fi scan filtering scheme.

According to various embodiments of the disclosure, the filtering scheme may include at least one of a filtering scheme which is based on a scan result of the electronic device 101, a filtering scheme which is based on a scan result of the external electronic device 102 or 104, or a secondary filtering scheme including at least one filtering condition.

According to various embodiments of the disclosure, if the filtering scheme is a filtering scheme which is based on a scan result of the electronic device 101, the at least one processor 204 may be configured to: detect other external electronic devices (e.g., an electronic device 102 or an electronic device 104 in FIG. 1) by performing, via the communication circuit 202, a scan operation, select at least one other external electronic device 102 or 104 enrolled in the electronic device 101 among the detected other external electronic devices 102 or 104, and select, as the network configuration information to be transmitted to the external electronic device 102 or 104, network configuration information which corresponds to the at least one other external electronic device 102 or 104 enrolled in the electronic device 101 among the plurality of network configuration information stored in the electronic device 101.

According to various embodiments of the disclosure, if the filtering scheme is a filtering scheme which is based on a scan result of the external electronic device 102 or 104, the at least one processor 204 may be configured to: receive, via the communication circuit 202, the scan result of the external electronic device 102 or 104 from the external electronic device 102 or 104, identify other external electronic devices 102 or 104 based on the scan result of the external electronic device 102 or 104, select at least one other external electronic device 102 or 104 enrolled in the electronic device 101 among the identified other external electronic devices 102 or 104, and select, as the network configuration information to be transmitted to the external electronic device 102 or 104, network configuration information which corresponds to the at least one other external electronic device 102 or 104 enrolled in the electronic device 101 among the plurality of network configuration information stored in the electronic device 101.

According to various embodiments of the disclosure, if the filtering scheme is a secondary filtering scheme including at least one filtering condition, the at least one processor 204 may be configured to: select, as the network configuration information to be transmitted to the external electronic device 102 or 104, at least one network configuration information which satisfies the at least one filtering condition among the plurality of network configuration information stored in the electronic device 101.

According to various embodiments of the disclosure, the at least one filtering condition includes at least one of: a first condition for selecting, as the network configuration information to be transmitted to the external electronic device 102 or 104, network configuration information which corresponds to at least one other external electronic device 102 or 104 to which the secondary filtering scheme is applied among other external electronic devices 102 or 104 which correspond to the plurality of network configuration information stored in the electronic device 101, a second condition for selecting, as the network configuration information to be transmitted to the external electronic device 102 or 104, network configuration information which corresponds to at least one other external electronic device 102 or 104 having a record of access by the electronic device 101 within a set period among the other external electronic devices 102 or 104 which correspond to the plurality of network configuration information stored in the electronic device 101, a third condition for selecting, as the network configuration information to be transmitted to the external electronic device 102 or 104, network configuration information which corresponds to at least one other external electronic device 102 or 104 existing within a set distance from the electronic device 101 among the other external electronic devices 102 or 104 which correspond to the plurality of network configuration information stored in the electronic device 101, a fourth condition for selecting, as the network configuration information to be transmitted to the external electronic device 102 or 104, network configuration information which corresponds to at least one other external electronic device 102 or 104 selected through an upper layer among the other external electronic devices 102 or 104 which correspond to the plurality of network configuration information stored in the electronic device 101, a fifth condition for selecting, as the network configuration information to be transmitted to the external electronic device 102 or 104, network configuration information which corresponds to at least one other external electronic device 102 or 104 whose channel quality is equal to or greater than threshold channel quality among the other external electronic devices 102 or 104 which correspond to the plurality of network configuration information stored in the electronic device 101, a sixth condition for selecting, as the network configuration information to be transmitted to the external electronic device 102 or 104, network configuration information which corresponds to at least one other external electronic device 102 or 104 which is selected based on network quality among the other external electronic devices 102 or 104 which correspond to the plurality of network configuration information stored in the electronic device 101, a seventh condition for selecting, as the network configuration information to be transmitted to the external electronic device 102 or 104, network configuration information which corresponds to at least one other external electronic device 102 or 104 which exists within a set distance from the electronic device 101 and has a record of access by the electronic device 101 within a set period among the other external electronic devices 102 or 104 which correspond to the plurality of network configuration information stored in the electronic device 101, or an eighth condition for selecting, as the network configuration information to be transmitted to the external electronic device 102 or 104, network configuration information which corresponds to at least one other external electronic device 102 or 104 which exists within a set distance from the electronic device 101 and which is selected through an upper layer among the other external electronic devices 102 or 104 which correspond to the plurality of network configuration information stored in the electronic device 101.

According to various embodiments of the disclosure, the at least one processor 204 may be further configured to: perform, via the communication circuit 202, an authentication operation with the external electronic device 102 or 104 based on secure information. In an embodiment of the disclosure, the authentication operation may include an operation of transmitting and receiving a DPP authentication request frame and a DPP authentication response frame between the electronic device 101 and the external electronic device 102 or 104. In an embodiment of the disclosure, at least one of a hash for a public bootstrapping key of a responder, a hash for a public bootstrapping key of an initiator, a public protocol key of the initiator, or initiator nonce attribute and an initiator capabilities attribute which are encrypted with a first intermediate key included in the DPP authentication request frame may be secure information used in an authentication operation, e.g., a DPP authentication operation. In an embodiment of the disclosure, at least one of the hash for the public bootstrapping key of the responder, the hash for the public bootstrapping key of the initiator, a public bootstrapping key of the responder, or a responder nonce attribute, a responder capabilities attribute, and an initiator capabilities attribute which are encrypted with a second intermediate key included in the DPP authentication response frame may be secure information used in the authentication operation, e.g., the DPP authentication operation.

According to various embodiments of the disclosure, an electronic device (e.g., an electronic device 101 in FIG. 1) may comprise a communication circuit (e.g., a communication circuit 202 in FIG. 2) and at least one processor (e.g., a processor 204 in FIG. 2). The at least one processor 204 may be configured to: perform, via the communication circuit 202, an authentication operation based on secure information with an external electronic device (e.g., an electronic device 102 or an electronic device 104 in FIG. 1), transmit, to the external electronic device 102 or 104 via the communication circuit 202, a first message requesting network configuration information, and receive, from the external electronic device 102 or 104 via the communication circuit 202, a second message including at least one network configuration information which is selected among a plurality of network configuration information stored in the external electronic device 102 or 104 based on a set filtering scheme. In an embodiment of the disclosure, the network configuration information may be a DPP configuration object. In an embodiment of the disclosure, the first message requesting the network configuration information may be a DPP configuration request frame. In an embodiment of the disclosure, the second message including the at least one network configuration information selected by the external electronic device 102 or 104 may be a DPP configuration response frame.

According to various embodiments of the disclosure, the filtering scheme may include at least one of a filtering scheme which is based on a scan result of the external electronic device 102 or 104, a filtering scheme which is based on a scan result of the electronic device 101, or a secondary filtering scheme including at least one filtering condition. In an embodiment of the disclosure, the filtering scheme which is based on the scan result of the external electronic device 102 or 104 may be a configurator-based Wi-Fi scan filtering scheme, and the filtering scheme which is based on the scan result of the electronic device 101 may be an enrollee-based Wi-Fi scan filtering scheme.

According to various embodiments of the disclosure, if the filtering scheme is a filtering scheme which is based on a scan result of the electronic device 101, the at least one processor 204 may be further configured to: transmit, via the communication circuit 202, the scan result of the electronic device 101 to the external electronic device 102 or 104, and the at least one network configuration information included in the second message may be network configuration information which corresponds to at least one other external electronic device 102 or 104 enrolled in the external electronic device 102 or 104 among other external electronic devices (e.g., an electronic device 102 or an electronic device 104 in FIG. 1) which correspond to the scan result among the plurality of network configuration information stored in the external electronic device 102 or 104.

According to various embodiments of the disclosure, if the filtering scheme is a filtering scheme which is based on a scan result of the external electronic device 102 or 104, the at least one network configuration information included in the second message may be network configuration information which corresponds to at least one other external electronic device 102 or 104 enrolled in the external electronic device 102 or 104 among other external electronic devices 102 or 104 which are identified based on the scan result of the external electronic device 102 or 104 among the plurality of network configuration information stored in the external electronic device 102 or 104.

A detailed description of a DPP proposed by a WFA is as follows.

In one embodiment of the disclosure, providing a process for easily and securely connecting a Wi-Fi device to a network may be essential for a continued growth and expansion of a Wi-Fi technology. In particular, in a market, such as a smart home or IoT where there are many Wi-Fi devices which do not have a UI or have a UI but have limitations on the UI, the process for easily and securely connecting the Wi-Fi device to the network may be more essential.

In order to configure a network connection of a Wi-Fi device, network information and a secure credential may need to be provided to the Wi-Fi device. In an embodiment of the disclosure, the secure credential may be information required for joining a peer-to-peer (P2P) group as defined in a Wi-Fi simple configuration specification. An operation of adding a Wi-Fi device which does not have a UI or has a limitation on a UI to a network may be cumbersome, and may be performed in a different way for each manufacturer of the Wi-Fi device.

There is a need for a Wi-Fi device configuration scheme which may easily and efficiently connect a Wi-Fi device to a Wi-Fi network, and for this, WFA has developed a DPP capable of simply and efficiently connecting a Wi-Fi device which does not have a UI or has a limited UI to a Wi-Fi network.

Based on a standardized mechanism, the DPP may simplify a configuration of the Wi-Fi device and directly connect the Wi-Fi device to the Wi-Fi network in a relatively easy way, for example, by scanning a product quick response (QR) code with a smart phone. In one embodiment of the disclosure, the DPP may provide, for example, an improved user experience, enhanced security, and/or IoT device provisioning support while simplifying network setup and client device provisioning.

According to various embodiments of the disclosure, in the DPP, for example, in a network, such as a home or an office, a network manager may set up an access point (AP) by using a trusted device, such as, for example, a smart phone, and manage network accesses of other client devices, for example, other client Wi-Fi devices. For example, the DPP is a protocol which enables a smooth user experience while maintaining a secure network connection by using a robust cryptography principle.

Figure 3:
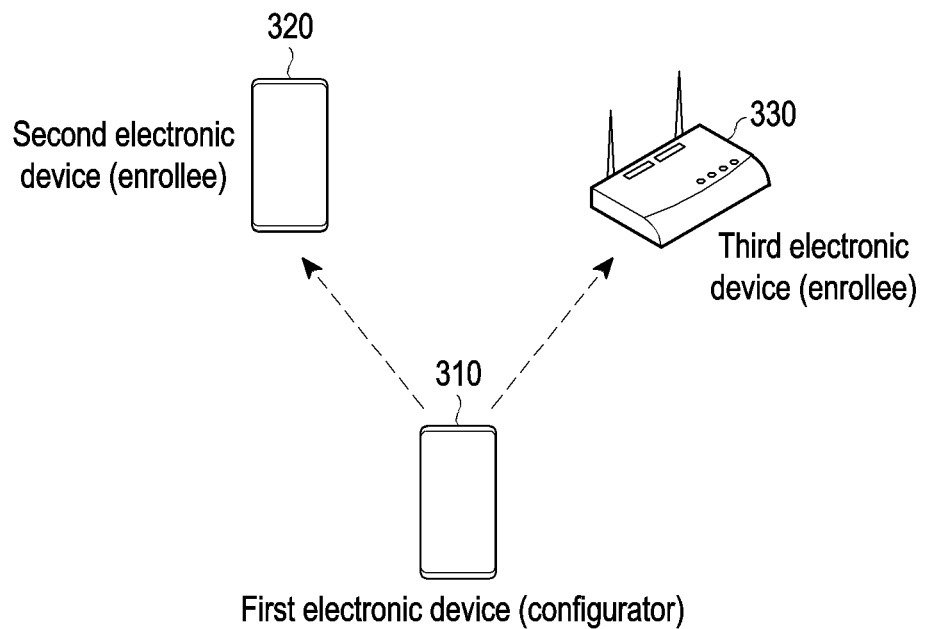
FIG. 3 is a diagram schematically illustrating an architecture of a Device Provisioning Protocol (DPP) network according to an embodiment of the disclosure.

FIG. 3 is a diagram schematically illustrating an architecture of a DPP network according to an embodiment of the disclosure.

In an embodiment of the disclosure, it will be noted that an architecture of a DPP network illustrated in FIG. 3 is an architecture according to a Wi-Fi provisioning role.

Referring to FIG. 3, the DPP network may include a plurality of electronic devices, for example, an electronic device (e.g., a first electronic device 310), and external electronic devices (e.g., a second electronic device 320 and a third electronic device 330). In an embodiment of the disclosure, each of the first electronic device 310, the second electronic device 320, and the third electronic device 330 may be a DPP device.

A DPP architecture may define device roles during a DPP bootstrapping operation, a DPP authentication operation, a DPP provisioning (or configuration) operation, and a DPP connectivity (or introduction) operation, and the device roles may include two types, for example, a configurator and an enrollee, or an initiator and a responder. In FIG. 3, the first electronic device 310 may operate as the configurator, and each of the second electronic device 320 and the third electronic device 330 may operate as the enrollee.

In the DPP network, the configurator may be a logical entity with capabilities to enroll and provision devices for a device-to-device (D2D) communication or an infrastructure communication.

In the DPP network, the initiator may represent a DPP device which initiates a DPP authentication protocol, and one of the configurator or the enrollee may be the initiator. In one embodiment of the disclosure, the responder may represent a DPP device which responds to initiation of the DPP authentication protocol by the initiator, and one of the configurator or the enrollee may be the responder.

The configurator may support setup of the enrollee, and the configurator and the enrollee may be involved in the DPP bootstrapping operation, the DPP authentication operation, and the DPP configuration operation. The configurator or the enrollee may operate as the initiator in the DPP bootstrapping operation and the DPP authentication operation. In contrast, the DPP configuration operation and the DPP introduction operation may only be initiated by the enrollee.

The configurator and the enrollee may possess bootstrapping keys from the same elliptic curve before starting the DPP authentication operation. In an embodiment of the disclosure, the elliptic curve may be an algorithm used for generating cryptographic keys. In an embodiment of the disclosure, if necessary (and depending on a bootstrapping method), bootstrapping keys may be generated upon request. The DPP authentication operation may require the initiator to obtain a bootstrapping key of the responder as part of a previous bootstrapping mechanism. Optionally, in the DPP authentication operation, the configurator and the enrollee may obtain each other's bootstrapping keys in order to provide mutual authentication.

After authentication is completed, the configurator may provision the enrollee for a D2D communication or an infrastructure communication. As part of this provisioning, the configurator may enable the enrollee to establish secure associations with other peers, for example, other external electronic devices in the DPP network.

In an embodiment of the disclosure, a detailed description of a configurator and an enrollee is as follows.

Firstly, a configurator will be described.

In a DPP network, a specific DPP device, for example, a main DPP device may be designated as the configurator. The configurator as a central configuration point may provision all DPP devices included in the DPP network including an AP. One of various DPP devices included in the DPP network may be the configurator.

Secondly, an enrollee will be described.

In an embodiment of the disclosure, the enrollee is a DPP device which a network manager of a DPP network wishes to connect to the DPP network. A DPP device which is added to the DPP network, for example, an AP, a smart home appliance, a computer, a printer, or a TV may be the enrollee, and all DPP devices capable of implementing a Wi-Fi function, except for a configurator, may be the enrollee.

Figure 4:
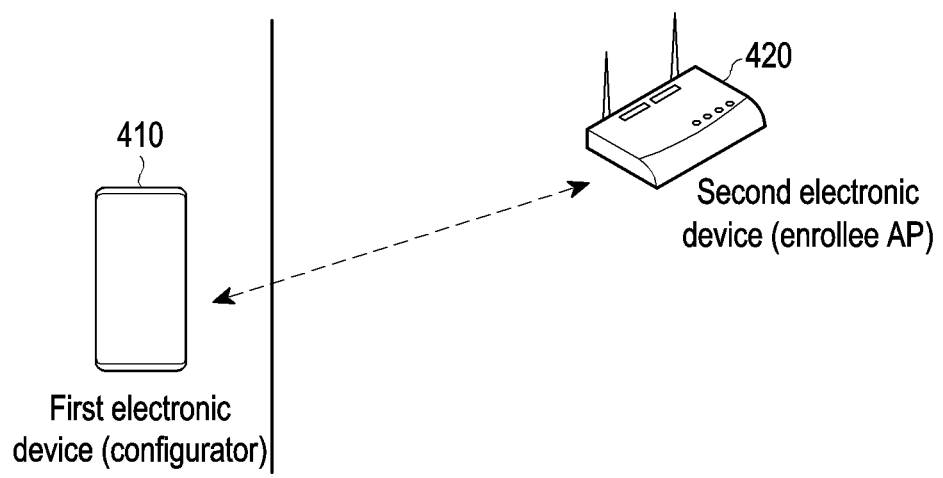
FIG. 4 is a diagram schematically illustrating a network configuration operation in a DPP network according to an embodiment of the disclosure.

FIG. 4 is a diagram schematically illustrating a network configuration operation in a DPP network according to an embodiment of the disclosure.

Referring to FIG. 4, a DPP network may include a plurality of electronic devices, e.g., an electronic device (e.g., a first electronic device 410) and an external electronic device (e.g., a second electronic device 420). In FIG. 4, each of the first electronic device 410 and the second electronic device 420 may be a DPP device, and it will be assumed that the first electronic device 410 operates as a configurator, and the second electronic device 420 operates as an enrollee AP.

In an embodiment of the disclosure, the first electronic device 410 may provision the second electronic device 420, e.g., an initial AP 420 which is an enrollee based on a DPP. The first electronic device 410 may provision enrollee clients (not shown separately in FIG. 4) which are other enrollees, thereby enabling enrollees to discover and select the DPP network, and connect to the DPP network.

As shown in FIG. 4, in an initial enrollment procedure, a network manager of the DPP network may configure the first electronic device 410, which is a mobile device, as a configurator, and then configure an AP (e.g., enrollee AP), e.g., the second electronic device 420 which is regarded as an enrollee through the first electronic device 410. Such an AP configuration operation may be performed before network connection, and the DPP network may be configured through such an AP configuration operation.

Figure 5:
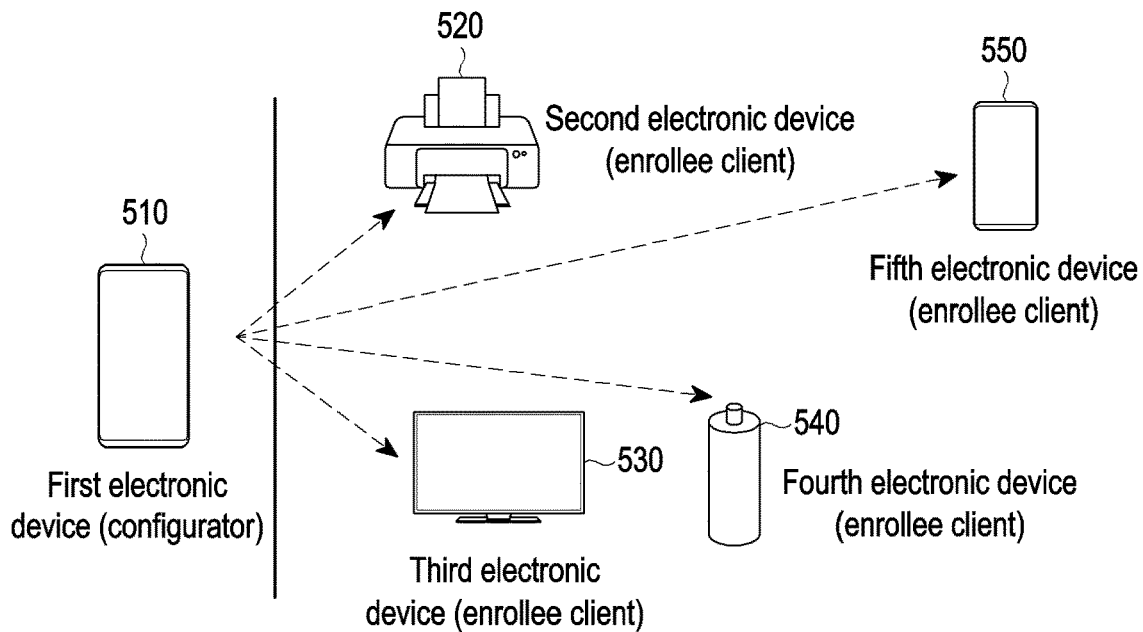
FIG. 5 is a diagram schematically illustrating an enrollment operation in a DPP network according to an embodiment of the disclosure.

FIG. 5 is a diagram schematically illustrating an enrollment operation in a DPP network according to an embodiment of the disclosure.

Referring to FIG. 5, after a DPP network is configured, a manager of the DPP network may initiate an enrollment procedure for enrolling DPP devices. In an embodiment of the disclosure, the DPP network may include a plurality of electronic devices, e.g., an electronic device (e.g., a first electronic device 510) and external electronic devices (e.g., a second electronic device 520, a third electronic device 530, a fourth electronic device 540, or a fifth electronic device 550). In FIG. 5, it will be assumed that the first electronic device 510 operates as a configurator, and each of the second electronic device 520, the third electronic device 530, the fourth electronic device 540, and the fifth electronic device 550 operates as an enrollee client.

At least one of the second electronic device 520, the third electronic device 530, the fourth electronic device 540, or the fifth electronic device 550 may obtain configuration for a connection to the DPP network based on information provisioned by the first electronic device 510. Then, the first electronic device 510 may generate a separate secure credential with a corresponding external electronic device, so the corresponding external electronic device may establish a connection to the DPP network. In an embodiment of the disclosure, the secure credential may be information required to join a peer-to-peer (P2P) group.

Figure 6:
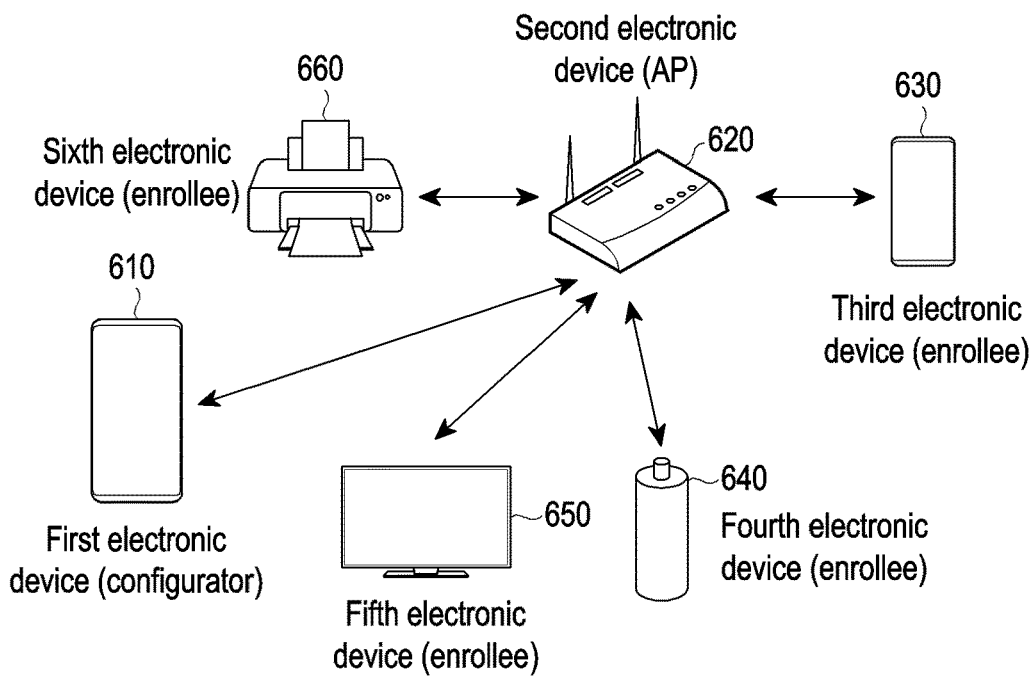
FIG. 6 is a diagram schematically illustrating a network connection operation in a DPP network according to an embodiment of the disclosure.

FIG. 6 is a diagram schematically illustrating a network connection operation in a DPP network according to an embodiment of the disclosure.

Referring to FIG. 6, after DPP devices are enrolled in a DPP network, a corresponding enrollee client may discover the DPP network through an AP 620 based on a configuration for a connection to the DPP network obtained in an enrollment procedure, and connect to the discovered DPP network. In an embodiment of the disclosure, the DPP network may include a plurality of electronic devices, e.g., an electronic device (e.g., a first electronic device 610) and external electronic devices (e.g., a second electronic device 620, a third electronic device 630, a fourth electronic device 640, a fifth electronic device 650, and a sixth electronic device 660). In FIG. 6, it will be assumed that the first electronic device 610 operates as a configurator, the second electronic device 620 operates as an AP, and each of the third electronic device 630, the fourth electronic device 640, the fifth electronic device 650, and the sixth electronic device 660 operates as an enrollee.

In an embodiment of the disclosure, the second electronic device 620 which is the AP may be connected to the first electronic device 610 which is the configurator, and at least one of the third electronic device 630, the fourth electronic device 640, the fifth electronic device 650, or the sixth electronic device 660 may discover the DPP network through the second electronic device 620, and connect to the discovered DPP network.

Meanwhile, WFA has developed Wi-Fi Easy Connect to make an operation of adding a Wi-Fi device to a Wi-Fi network much simpler and more efficient. The Wi-Fi Easy Connect supports a bootstrapping mechanism, and the bootstrapping mechanism is a mechanism which may minimize user's work per Wi-Fi device and add securely a configurator and an enrollee to the Wi-Fi network. The Wi-Fi Easy Connect may use an enrollee QR code to support the bootstrapping mechanism.

In an embodiment of the disclosure, the QR code may include various information, such as, for example, a secure key and a unique identifier of a Wi-Fi device. The QR code may be recognized by a Wi-Fi device having a QR code scanning function, and prevent a hassle of a user having to manually input information for Wi-Fi device authentication. Alternatively, the QR code may also prevent an issue which may occur due to a data input error.

An example of a provisioning operation using a QR code and a configurator in a Wi-Fi Easy Connect network will be described.

(1) A QR code of an enrollee may be scanned by using a camera which the configurator has. The QR code may be provided in a form of a sticker or a card.

(2) The configurator may read and decrypt the QR code to automatically discover a secure Wi-Fi communication link with the enrollee, and establish the secure Wi-Fi communication link with the enrollee based on the discovered result.

(3) The configurator may configure Wi-Fi network information to the enrollee by using a secure channel.

(4) If configuration of the Wi-Fi network information for the enrollee is completed, the enrollee may use the Wi-Fi network information provided by the configurator to discover a Wi-Fi network without intervention of a user, select a specific Wi-Fi network based on the discovered result, and perform a connection operation to the selected Wi-Fi network.

Meanwhile, in a Wi-Fi Easy Connect network, if a configurator does not have a function capable of recognizing a QR code, or if an enrollee does not have a function of displaying the QR code, it may be possible to establish a Wi-Fi communication link between the configurator and the enrollee by directly inputting a string by a user.

Meanwhile, a Wi-Fi Easy Connect technology may be designed to be flexible to provision Wi-Fi devices in a variety of ways, and may support that a configurator or an enrollee initiates a provisioning operation. As may be seen from an example of the provisioning operation as described above, a Wi-Fi device, for example, a smart phone, which operates as the configurator may scan a QR code of a Wi-Fi device, for example, an IoT device which operates as the enrollee, and include the QR code of the IoT device into Wi-Fi network information to be provisioned.

Alternatively, the configurator may provide the QR code of the enrollee for Wi-Fi configuration provisioning. For example, in a Wi-Fi network in a hotel, the configurator may provide the enrollee, for example, a hotel room TV with the QR code. Then, a customer may scan the QR code provided through the hotel room TV by using a smart phone which will perform a provisioning operation, and accordingly, the provisioning operation may be performed as described above. For example, the smart phone of the customer may be on-board to a Wi-Fi network of the hotel.

In an embodiment of the disclosure, a provisioning process proposed in a DPP may include a total of four operations, i.e., a DPP bootstrapping operation, a DPP authentication operation, a DPP configuration operation, and a DPP access operation. In an embodiment of the disclosure, the DPP access operation may also be referred to as a peer discovery operation. In an embodiment of the disclosure, in three operations up to the DPP bootstrapping operation, the DPP authentication operation, and the DPP configuration operation, one electronic device may operate as a configurator and an external electronic device may operate as an enrollee. In an embodiment of the disclosure, the configurator may perform an operation of configuring electronic devices connected to a DPP network as described above.

In an embodiment of the disclosure, an AP which is an enrollee may perform an operation of providing an access to a network as described above. In an embodiment of the disclosure, the enrollee may be an enrollee client or the AP, and if network configuration is completed, the enrollee may be connected to the AP to access the network or may operate as the AP to provide the access to the network.

A DPP bootstrapping operation, a DPP authentication operation, a DPP configuration operation, and a DPP access operation will be described below.

Firstly, a DPP bootstrapping operation will be described.

According to an embodiment of the disclosure, in the DPP bootstrapping operation, DPP devices may exchange public bootstrapping keys to establish a secure provisioning connection. In an embodiment of the disclosure, the public bootstrapping keys may be secure information used in the DPP bootstrapping operation.

To explain this, an identifier (ID) is assigned to a DPP device, and a QR code or a string (a printed matter or digital) which a user may read may be included in the ID assigned to the DPP device in a form of a public key and a private key. In the DPP bootstrapping operation, a configurator and an enrollee may establish a trusted relationship to perform mutual authentication and establish a secure connection based on a result of the mutual authentication.

In an embodiment of the disclosure, as described above, in the DPP bootstrapping operation, public bootstrapping keys are exchanged, and the public bootstrapping keys are transmitted in one way or exchanged bidirectionally depending on whether mutual authentication between the configurator and the enrollee is required. In the DPP bootstrapping operation, for example, the public bootstrapping keys may be exchanged based on, for example, various schemes, such as a QR code scheme, a Bluetooth scheme, a Bluetooth low energy (BLE) scheme, a near field communication (NFC) scheme, and a public key exchange (PKEX) scheme, or a cloud scheme.

After the public bootstrapping keys are exchanged, a connection may be established between the configurator and the enrollee. In an embodiment of the disclosure, the public bootstrapping keys may be different from secure credentials received by the enrollee in a DPP configuration operation after the DPP bootstrapping operation. In an embodiment of the disclosure, bootstrapping information may be used in a DPP authentication operation and the DPP configuration operation after the DPP bootstrapping operation, and may include a small list of global operating class/channel pairs and a medium access control (MAC) address. In an embodiment of the disclosure, the small list of the global operating class/channel pairs may ideally include only one channel.

Secondly, a DPP authentication operation and a DPP configuration operation will be described.

According to an embodiment of the disclosure, in the DPP authentication operation, DPP devices may establish a reliable and secure channel by using bootstrapping keys in a DPP authentication protocol, and in the DPP configuration operation, a configurator may execute a DPP configuration protocol to provision an enrollee via a secure channel established during the DPP authentication operation. This will be described as follows.

According to an embodiment of the disclosure, if a DPP bootstrapping operation is completed, the configurator and the enrollee may establish a secure Wi-Fi connection by using the DPP authentication protocol. The configurator which is an initiator in the DPP authentication operation and the DPP configuration operation may request authentication to the enrollee which is a responder based on channel information obtained through the DPP bootstrapping operation. For example, the configurator may request the authentication by transmitting a DPP authentication request frame to the responder. In an embodiment of the disclosure, the DPP authentication request frame may include at least one of a hash for a public bootstrapping key of the responder, a hash for a public bootstrapping key of the initiator, a public protocol key of the initiator, or an initiator nonce attribute and an initiator capabilities attribute which are encrypted with a first intermediate key. In an embodiment of the disclosure, the at least one of the hash for the public bootstrapping key of the responder, the hash for the public bootstrapping key of the initiator, the public protocol key of the initiator, or the initiator nonce attribute and the initiator capabilities attribute which are encrypted with the first intermediate key included in the DPP authentication request frame may be secure information used in the DPP authentication operation.

In an embodiment of the disclosure, the enrollee may respond to an authentication request of the configurator while waiting on a corresponding channel based on the channel information obtained through the DPP bootstrapping operation. For example, the enrollee may respond to the authentication request by transmitting a DPP authentication response frame to the configurator. In an embodiment of the disclosure, the DPP authentication response frame may include at least one of the hash for the public bootstrapping key of the responder, the hash for the public bootstrapping key of the initiator, a public protocol key of the responder, or a responder nonce attribute, a responder capabilities attribute, and an initiator capabilities attribute which are encrypted with a second intermediate key. In an embodiment of the disclosure, the at least one of the hash for the public bootstrapping key of the responder, the hash for the public bootstrapping key of the initiator, the public protocol key of the responder, or the responder nonce attribute, the responder capabilities attribute, and the initiator capabilities attribute which are encrypted with the second intermediate key included in the DPP authentication response frame may be secure information used in the DPP authentication operation.

As the DPP authentication operation is completed, a secure connection may be established between the configurator and the enrollee, and after the secure connection is established, the enrollee may start transaction for obtaining network configuration information from the configurator. For example, the responder may transmit a DPP configuration request frame to the configurator, and the configurator may transmit, to the responder, a DDP configuration response frame which is a response frame to the DDP configuration request frame. The responder may verify the secure credentials and network information obtained through the DPP configuration protocol, and transmit a result thereof to the configurator. As such a DPP configuration operation is completed, the enrollee may operate as an AP, or may discover a target AP, and be securely connected to the discovered target AP.

In an embodiment of the disclosure, encoded configuration information transmitted and received in a DPP configuration operation may include a DPP configuration object, the DPP configuration object may include the following DPP configuration object parameters, and the DPP configuration object may be a javascript object notation (JSON) encoded data structure. In an embodiment of the disclosure, the DPP configuration object may be referred to as network configuration information.

(1) Wi-Fi Technology Object

A Wi-Fi technology object may identify a Wi-Fi technology of a policy to be provisioned, and the Wi-Fi technology object may indicate a connection type, such as an AP infra connection. In an embodiment of the disclosure, an enrollee may set a value of a Wi-Fi technology object included in a DDP configuration request frame to a value indicating a Wi-Fi technology to be provisioned, and a configurator may set a value of a Wi-Fi technology object included in a DPP configuration response frame to a value indicating a Wi-Fi technology which is used in an operation between the enrollee and the configurator. In an embodiment of the disclosure, a Wi-Fi technology object may indicate a Wi-Fi technology to be used in a DPP authentication operation, a DPP configuration operation, and/or the like.

(2) DPP Discovery Object

A DPP discovery object may include, for example, operating or discovery information, such as a service set identifier (SSID), an operating channel, or an operating band, and/or the like.

(3) Credential Object

A credential object may include credential information which is provisioned by an enrollee to obtain a secure network access. The credential information may depend on a value of an authentication and key management (AKM) type parameter included in a DPP configuration object.

Meanwhile, in a DPP configuration operation, network configuration information, e.g., a DPP configuration object, including network information, such as secure credential information and an SSID may be transmitted from a configurator to an enrollee. In an embodiment of the disclosure, the secure credential information may include a connector, the connector may be credential information provisioned by the enrollee, and the connector may be used by a pair of enrollees to set security association by using a DPP network introduction protocol.

In an embodiment of the disclosure, the connector may be a credential signed by the configurator, and may be used by an enrollee client to connect to an enrollee AP. In an embodiment of the disclosure, the configurator may own, for example, a c-sign-key and a C-sign-key which are a signing key pair, the c-sign-key may be used by the configurator to sign connectors, and the C-sign-key may be used for provisioned DPP devices to verify connectors of other DPP devices which are signed by the same configurator.

A connector of each enrollee may include a public key, a network role, and group attribute information, and may be signed by a configurator. The public key may provide an ID of a corresponding enrollee. The network role may indicate whether the corresponding enrollee is an enrollee (an enrollee client or an enrollee STA) or an enrollee AP. The group attribute information may be used for detecting whether an enrollee may establish a network connection. A connector signature may prove that corresponding connector contents were generated by the configurator. A connector includes a public key rather than a password, so secure credential information may be different per Wi-Fi device, i.e., per enrollee. For example, another enrollee may not access a network by using the corresponding connector, and a case that an enrollee corresponding to the corresponding connector belongs to a specific AP may mean that another AP may not impersonate the specific AP.

In an embodiment of the disclosure, the enrollee client may discover the enrollee AP based on network information. The enrollee client may perform an authentication operation based on a connector, and establish a network connection based on a network introduction (NI) protocol. An advantage of using the connector may be that each enrollee connected to an AP has unique secure credential information.

Figure 7:
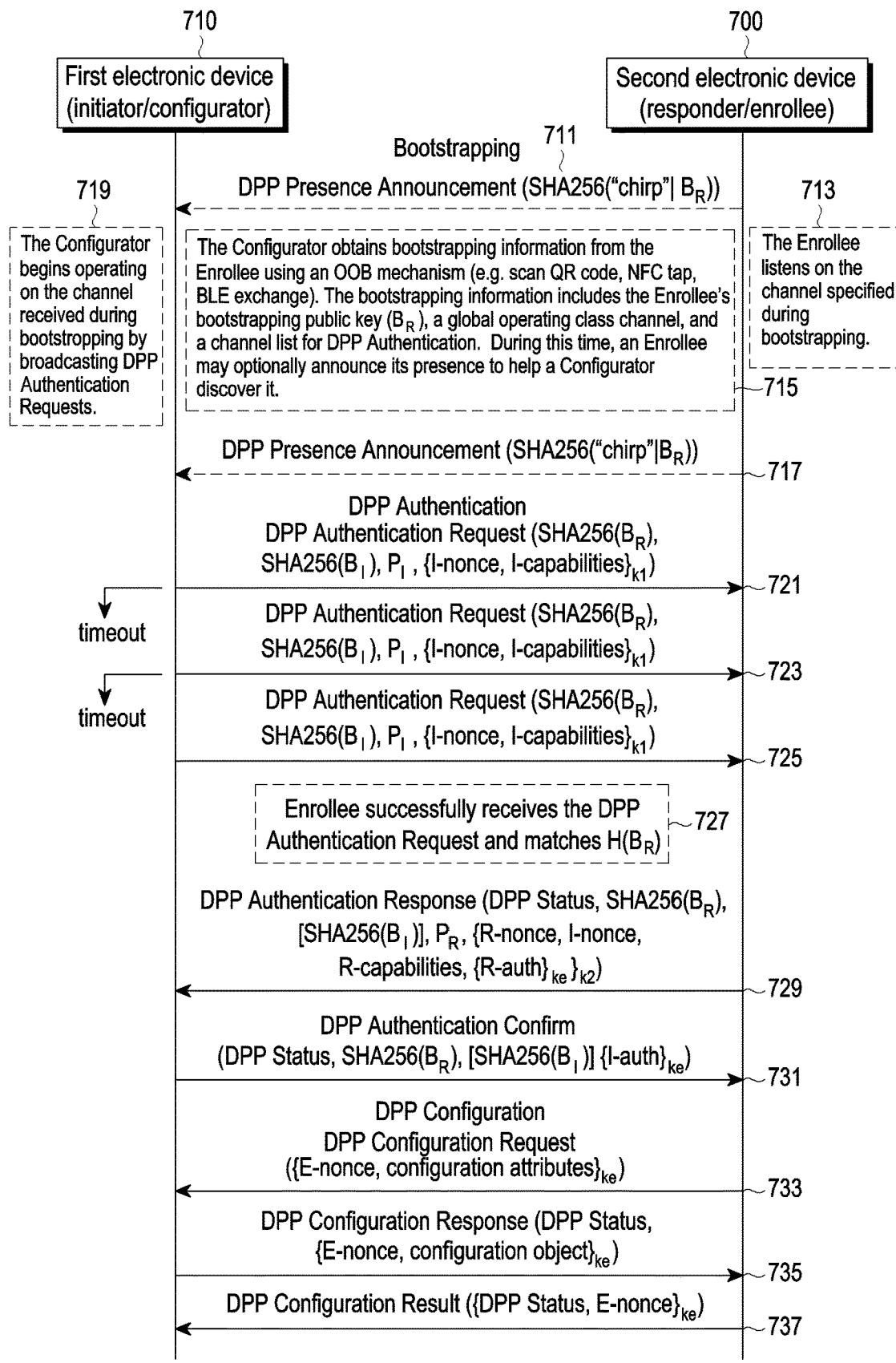
FIG. 7 is a diagram schematically illustrating a provisioning process in a DPP network according to an embodiment of the disclosure.

FIG. 7 is a diagram schematically illustrating a provisioning process in a DPP network according to an embodiment of the disclosure.

Referring to FIG. 7, each of an electronic device, for example, a first electronic device 710, and an external electronic device, for example, a second electronic device 700 may be a DPP device, and it will be assumed that the first electronic device 710 operates as both a configurator and an initiator, and the second electronic device 700 operates as both an enrollee and a responder.

In operation 711, the second electronic device 700 operating as both the enrollee and the responder may transmit a DPP presence announcement frame. In an embodiment of the disclosure, the DPP presence announcement frame may be used to signal, to the initiator which is the configurator, that the responder is ready to participate in DPP exchange, and may include a hash including a public bootstrapping key of a transmitter, e.g., the responder. In an embodiment of the disclosure, the hash including the public bootstrapping key of the responder may be secure information used in a DPP bootstrapping operation. In an embodiment of the disclosure, a hash for the DPP presence announcement frame to prevent leakage of a hash of a public key of a unprovisioned device may be SHA256 ("chirp" | $B_R$). In an embodiment of the disclosure, $B_R$ may represent the public bootstrapping key of the responder, for example, the second electronic device 700.

In operation 713, the second electronic device 700 may perform a listening operation on a specified channel during the DPP bootstrapping operation. The first electronic device 710 which operates as both the configurator and the initiator may use an out-of-band (OOB) mechanism, for example, QR code scan, NFC tap, or BLE exchange to obtain bootstrapping information from the second electronic device 700. In an embodiment of the disclosure, the bootstrapping information may include the public bootstrapping key ($B_R$) of the second electronic device 700, a global operating class channel, and/or a channel list for DPP authentication. During the DPP bootstrapping operation, in operation 715, the second electronic device 700 may optionally announce presence of the second electronic device 700 to help the first electronic device 710 discover the second electronic device 700. In operation 717, the second electronic device 700 may transmit a DPP presence announcement frame.

In operation 719, the first electronic device 710 may start operating on a channel based on channel information received during bootstrapping by broadcasting DPP authentication request frames. For example, the first electronic device 710 may continuously broadcast DPP authentication request frames in operations 721, 723, and 725. In an embodiment of the disclosure, a DPP authentication request frame may include SHA256 ($B_R$), SHA256 ($B_I$), $P_I$, and $\{I\text{-nonce}, I\text{-capabilities}\}_{k1}$. For example, SHA256 ($B_R$) may represent a SHA256 hash for $B_R$, $B_I$ may represent a public bootstrapping key of the first electronic device 710, SHA256 ($B_I$) may represent a SHA256 hash for $B_I$, $P_I$ may represent a public protocol key of the first electronic device 710, I-nonce may represent an initiator nonce attribute, I-capabilities may represent an initiator capabilities attribute, and k1 may represent a first intermediate key. In an embodiment of the disclosure, $\{I\text{-nonce}, I\text{-capabilities}\}_{k1}$ may represent I-nonce and I-capabilities which are encrypted with k1. In an embodiment of the disclosure, at least one of SHA256 ($B_R$), SHA256 ($B_I$), $P_I$, or $\{I\text{-nonce}, I\text{-capabilities}\}_{k1}$ included in the DPP authentication request frame may be secure information used in a DPP authentication operation.

In operation 727, if the first electronic device 710 broadcasts the DPP authentication request frames and the second electronic device 700 successfully receives this DPP authentication request frame, the second electronic device 700 may matchH($B_R$) which is a hash function value for $B_R$. In operation 729, the second electronic device 700 may transmit, to the first electronic device 710, a DPP authentication response frame which is a response frame to the DPP authentication request frame. In an embodiment of the disclosure, the DPP authentication response frame may include a DPP status field, SHA256 ($B_R$), [SHA256 ($B_I$)], $P_R$, and $\{R\text{-nonce}, I\text{-nonce}, R\text{-capabilities}, \{R\text{-auth}\}_{ke}\}_{k2}$. For example, $P_R$ may represent a public protocol key of the second electronic device 700, R-nonce may represent a responder nonce attribute, R-capabilities may represent a responder capabilities attribute, R-auth may represent an authentication tag of the responder, for example, the second electronic device 700, ke may represent an encryption key, k2 may represent a second intermediary key, and [ ] may represent a value optionally present. For example, [SHA256 ($B_I$)] may be optionally included in the DPP authentication response frame or may be included in the DPP authentication response frame if a specific condition is satisfied. In an embodiment of the disclosure, $\{R\text{-auth}\}_{ke}$ may represent R-auth encrypted with ke. In an embodiment of the disclosure, {R-nonce, I-nonce, R-capabilities, {R-auth}$_{ke}$}$_{k2}$ may represent R-nonce, I-nonce, R-capabilities, and {R-auth}$_{ke}$ which are encrypted with k2. In an embodiment of the disclosure, at least one of SHA256 (B$_R$), [SHA256 (B$_I$)], P$_R$, or {R-nonce, I-nonce, R-capabilities, {R-auth}$_{ke}$}$_{k2}$ included in the DPP authentication response frame may be secure information used in the DPP authentication operation.

The DPP status field may indicate a status as shown in Table 1 below.

TABLE 1

| Status or Error | Value | Meaning |
| --- | --- | --- |
| STATUS_OK | 0 | No errors or abnormal behavior |
| STATUS_NOT_COMPATIBLE | 1 | The DPP Initiator and Responder have incompatible capabilities |
| STATUS_AUTH_FAILURE | 2 | Authentication failed |
| STATUS_BAD_CODE | 3 | The code used in PKEX is bad |
| STATUS_BAD_GROUP | 4 | An unsupported group was offered |
| STATUS_CONFIGURE_FAILURE | 5 | Configurator refused to configure Enrollee |
| STATUS_RESPONSE_PENDING | 6 | Responder will reply later |
| STATUS_INVALID_CONNECTOR | 7 | Received Connector is invalid for some reason. The sending device needs to be reconfigured. |
| STATUS_NO_MATCH | 8 | Received Connector is verified and valid but no matching Connector could be found. The receiving device needs to be reconfigured. |
| STATUS_CONFIG_REJECTED | 9 | Enrollee rejected the configuration. |
| STATUS_NO_AP | 10 | Enrollee failed to discover an access point. |
| STATUS_CONFIGURE_PENDING | 11 | Configuration response is not ready yet. The enrollee needs to request again. |
| STATUS_CSR_NEEDED | 12 | Configuration requires a Certificate Signing Request. The enrollee needs to request again. |
| STATUS_CSR_BAD | 13 | The Certificate Signing Request was invalid. |
| STATUS_NEW_KEY_NEEDED | 14 | The Enrollee needs to generate a new Protocol key. |

In operation 731, the first electronic device 710 receiving the DPP authentication response frame from the second electronic device 700 may transmit a DPP authentication confirm frame to the second electronic device 700. In an embodiment of the disclosure, the DPP authentication confirm frame may include a DPP status field, SHA256 (B$_R$), [SHA256 (B$_I$)], and {I-auth}$_{ke}$. In an embodiment of the disclosure, I-auth may represent an authenticating tag of the initiator, for example, the first electronic device 710, and ke may represent an encryption key. In an embodiment of the disclosure, {I-auth}$_{ke}$ may represent I-auth encrypted with ke.

In operation 733, the second electronic device 700 receiving the DPP authentication confirm frame from the first electronic device 710 may transmit a DPP configuration request frame to the first electronic device 710. In an embodiment of the disclosure, the DPP configuration request frame may include {E-nonce, configuration attributes}$_{ke}$. In an embodiment of the disclosure, E-nonce may represent an E-nonce attribute, and configuration attributes may represent configuration attribute objects. A configuration attribute object may include at least one of a device name attribute, a Wi-Fi technology attribute, or a network role attribute. In an embodiment of the disclosure, {E-nonce, configuration attributes}$_{ke}$ may represent E-nonce and configuration attributes which are encrypted with ke.

In operation 735, the first electronic device 710 receiving the DPP configuration request frame may transmit, to the second electronic device 700, a DPP configuration response frame which is a response to the DPP configuration request frame. In an embodiment of the disclosure, the DPP configuration response frame may include a DPP status field and {E-nonce, configuration object}$_{ke}$. In an embodiment of the disclosure, a configuration object may represent a DPP configuration object. In an embodiment of the disclosure, {E-nonce, configuration object}$_{ke}$ may represent an E-nonce and a configuration object which are encrypted with ke.

In operation 737, the second electronic device 700 receiving the DPP configuration response frame may transmit a DPP configuration result frame to the first electronic device 710. In an embodiment of the disclosure, the DPP configuration result frame may include {DPP Status, E-nonce}$_{ke}$. In an embodiment of the disclosure, {DPP Status, E-nonce}$_{ke}$ may represent a DPP Status and an E-nonce which are encrypted with ke.

Thirdly, a DPP access operation in a provisioning process will be described.

In an embodiment of the disclosure, a network introduction protocol is used so that an enrollee client may be securely connected to an enrollee AP by using a connector provided by a configurator, and a DPP access operation which is based on the network introduction protocol is as follows.

(1) Each of enrollee clients and the enrollee AP may identify whether a connector of each of the enrollee clients and the enrollee AP is signed by the configurator.

(2) Each of the enrollee clients may identify that a role of each of the enrollee clients is compatible and establish a communication with the enrollee AP.

(3) The enrollee clients may identify whether group attributes are matched.

(4) Each of the enrollee AP and the enrollee clients may derive a pairwise master key (PMK) based on a public connector key.

(5) A connection may be established between the enrollee AP and the enrollee clients based on the derived PMK.

Figure 8:
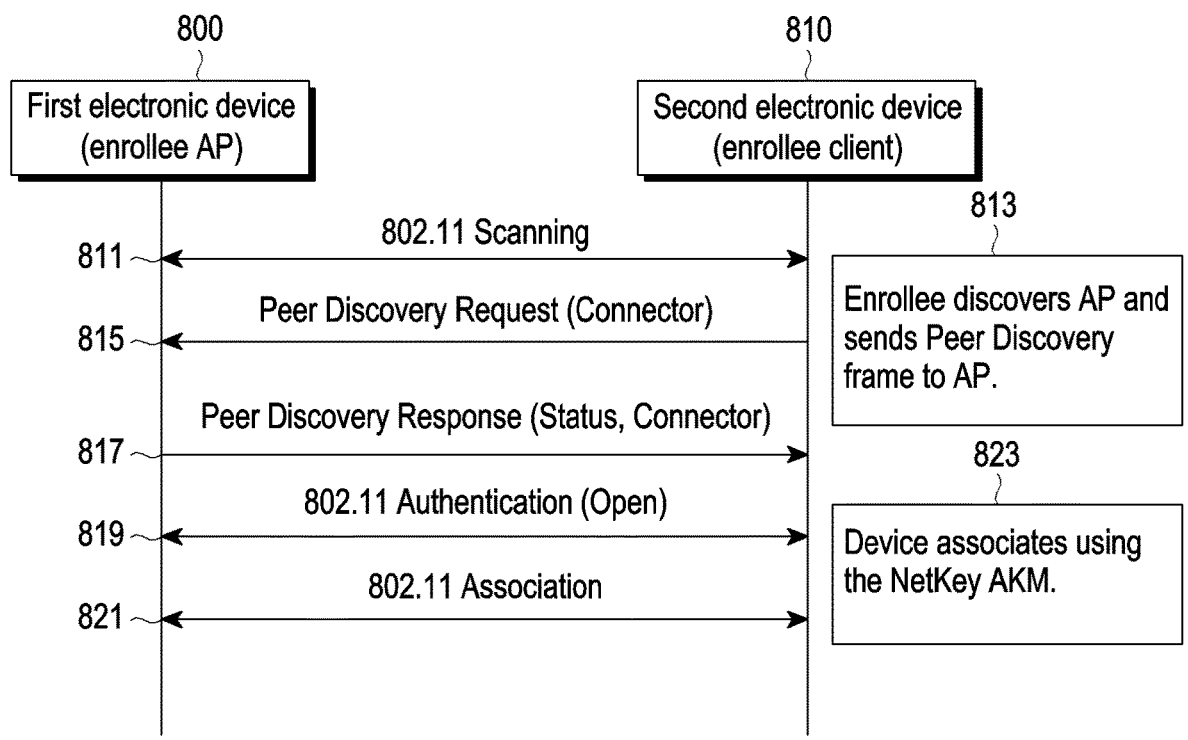
FIG. 8 is a signal flow diagram schematically illustrating a network access operation using a connector according to an embodiment of the disclosure.

FIG. 8 is a signal flow diagram schematically illustrating a network access operation using a connector according to an embodiment of the disclosure.

Referring to FIG. 8, each of an electronic device, for example, a first electronic device 800, and an external electronic device, for example, a second electronic device 810 may be a DPP device, and it will be assumed that the first electronic device 800 may operate as an enrollee AP, and the second electronic device 810 operates as an enrollee client.

In operation 811, the second electronic device 810 as the enrollee client may perform an IEEE 802.11 scanning operation which is based on an IEEE 802.11 standard. In operation 813, the second electronic device 810 may discover the first electronic device 800 which is the enrollee AP according to performance of an IEEE 802.11 scanning operation. In operation 815, the second electronic device 810 may transmit, to the discovered first electronic device 800, a peer discovery request frame including a connector attribute. In operation 817, the first electronic device 800 may receive the peer discovery request frame from the second electronic device 810, and transmit, to the second electronic device 810, a peer discovery response frame in response to the peer discovery request frame. In an embodiment of the disclosure, the peer discovery response frame may include a connector attribute and a state attribute, and the state attribute may indicate a DPP state attribute.

In operation 819, upon receiving the peer discovery response frame from the first electronic device 800, the second electronic device 810 may perform an IEEE 802.11 authentication operation which is based on the IEEE 802.11 standard with the first electronic device 800. In operation 821, the second electronic device 810 may perform, with the first electronic device 800, an IEEE 802.11 association operation which is based on the IEEE 802.11 standard. In operation 823, the second electronic device 810 may be associated with the first electronic device 800 by using an authentication and key management (AKM) which is a network key.

A DPP configuration object according to various embodiments of the disclosure will be described as follows.

In an embodiment of the disclosure, a configurator may provision an enrollee with information for discovering a network as well as credentials for setting a secure access for a DPP network. The enrollee may include a DPP configuration request object in a DPP configuration request frame, and transmit, to the configurator, the DPP configuration request frame including the DPP configuration request object.

Upon receiving the DPP configuration request frame, the configurator may process the received DPP configuration request frame to generate one or more DPP configuration objects. The configurator may include the generated one or more DPP configuration objects in a DPP configuration response frame which is a response frame to the DPP configuration request frame, and transmit, to the enrollee, the DPP configuration response frame including the one or more DPP configuration objects. In an embodiment of the disclosure, the DPP configuration response frame may include a DPP status field as well as the one or more DPP configuration objects. In an embodiment of the disclosure, the one or more DPP configuration objects included in the DPP configuration response frame may vary based on DPP status and at least one set condition. This will be described as follows.

In an embodiment of the disclosure, if configuration has proceeded normally and a configurator intends to grant network connection authority to an enrollee, the configurator may include DPP status and one or more DPP configuration objects in a DPP configuration response frame to transmit, to the enrollee, the DPP configuration response frame including the DPP status and the one or more DPP configuration objects. In this case, attributes included in the DPP configuration response frame may be expressed as shown in Table 2 below.

TABLE 2

| Attribute | Required (R)/ Conditional (C) | Notes |
| --- | --- | --- |
| DPP Status | R | If configuration is succeeded, it is marked as STATUS_OK. |
| Wrapped Data | R | The following sub-attribites are wrapped with AES-SIV ciphertext. |
| Enrollee Nonce | R | This attribite is a component of Wrapped Data. |
| DPP Configuration Object (one or more) | C | One or more JSON encoded DPP Configuration Object attribute. These are components of Wrapped Data. |

In Table 2, a DPP Status attribute is marked with "STATUS_OK" indicating that no error or abnormal operation exists, and "STATUS_OK" may indicate that configuration is successful.

In Table 2, Wrapped Data may indicate that the following sub-attributes are wrapped with an advanced encryption standard-synthetic initialization vector (AES-SIV) ciphertext. In Table 2, Enrollee Nonce may be a component of a Wrapped Data attribute. In Table 2, a DPP Configuration Object attribute may be one or more JSON-encoded DPP configuration object attributes, and the DPP Configuration Object attribute may also be a component of Wrapped Data.

In an embodiment of the disclosure, a DPP configuration object may include a Wi-Fi connection type, an SSID, and credential information for accessing a network of an AP. The DPP configuration object may include a Wi-Fi technology object, a discovery object, or a credential object, and/or the like, as described above. The Wi-Fi technology object may indicate a Wi-Fi connection type to be used, the discovery object may include an SSID, and the credential object may include a key, a password, and/or a connector according to an AKM type.

In an embodiment of the disclosure, if a value of an AKM parameter is a value indicating a DPP, authentication between the configurator and an enrollee AP may proceed using a connector. In an embodiment of the disclosure, if the value of the AKM parameter is not the value indicating the DPP, but another value indicating a preshared key (PSK) or SAE (simultaneous authentication of equals), and/or the like, authentication between the configurator and a legacy AP may proceed using Passphrase, or Password, and/or the like.

In an embodiment of the disclosure, the configurator may include the one or more JSON-encoded DPP configuration objects in the DPP configuration response frame, so network access authority for a plurality of APs may be transmitted through one DPP configuration response frame.

In an embodiment of the disclosure, an example of a JSON-encoded DPP configuration object may be shown in Table 3 below.

TABLE 3

```
{
"wi-fi_tech":"infra",
"discovery":
{
"ssid":"mywifi"
},
"cred":
{
"akm":"dpp",
"siqnedCcnnector":
"eyJ0eXAiOiJkcHBDb24iLCJraWQiOiJrTWNlZ0RCUG1OWlZha0FzQlpPek9vQ3N
2UWprcl9uRUFwOXVGLUVEbVZFIiwiYWxnIjoiRVMyNTYifQ.eyJncm91cHMiO
1t7Imdyb3VwSWQiOiJob21IiwibmVOUm9sZSI6IN0YSJ9LHsiZ3JvdXBJZCI6ImN
vdERhZ2UiLCJuZXRSb2xlIjoic3RhIn1dLCJuZXRBY2Nlc3NLZXkiOnsia3R5IjoiR
UMiLCJjcnYiOiJQLTI1NiIsIngiOiJYai16VjJpRWlIOFh3eUE5aWpwc0w2eHlMdkR
pSUJ0aHJITzhaVnh3bXBBIiwieSI6IkxVc0RCbW43bnYtTENubjZmQm9YS3NLcE
xHSmlWcFlfa25UY2tHZ3NnZVUifSwiZXhwaXJ5IjoiMjAxOS0wMS0zMVOyMjo
wMDowMCswMjowMCJ9.8fJSNCpDjv5BEFfmlqEbBNTaHx2L6c_22Uvr9KYjtAw
88VfvEUWiruECUSJCUVFqv1yDEE4RJVdTIw3aUDhlMw",
"csign":
{
"kty":"EC",
"crv":"P-256",
"x":"MKBCTNIcKUSDii11ySs3526iDZ8AiTo7Tu6KPAqv7D4",
"y":"4Etl6SRW2YiLUrN5vfvVHuhp7x8PxltmWWlbbM4IFyM",
"kid":"kMcegDBPmNZVakAsBZOzOoCsvQjkr_nEAp9uF-EDmVE"
},
"ppKey":
{
"kty":"EC",
"crv":"P-256",
"x":"XX_ZuJR9nMD3b54C_okhGiJ7OjCZOlWOU9m8zAxgUrU",
"y":"Fekm5hyGii80amM_REV5sTOG3-s11H6MDpZ8TSKnb7c"
}
}
}
```

As described above, the configurator may include the one or more JSON-encoded DPP configuration objects in the DPP configuration response frame, the network access authority for the plurality of APs may be transmitted through the one DPP configuration response frame.

In an embodiment of the disclosure, a case in which one DPP configuration object is included in a DPP configuration response frame may correspond to operation 735 in FIG. 7. In an embodiment of the disclosure, if the DPP configuration response frame includes, for example, three DPP configuration objects, the DPP configuration response frame in operation 735 in FIG. 7 may include a DPP status field and {E-nonce, configuration object, configuration object, configuration object}$_{ke}$. Each of the three DPP configuration objects may be JSON-encoded as shown in 4 below.

TABLE 4

```
{
"wi-fi_tech": ... ,
```

TABLE 4-continued

```
"discovery": ...
"cred": ...
} {
"wi-fi_tech": ... ,
"discovery": ... ,
"cred": ...
} {
"wi-fi_tech": ... ,
"discovery": ... ,
"cred": ...
}
```

It will be noted that the three DPP configuration objects as shown in Table 4 briefly show a JSON-encoded DPP configuration object as shown in Table 3 as an example for convenience of description.

Meanwhile, in a user environment, a plurality of APs may exist in a specific place, such as a home, an office, or a workplace, and the APs generally have the same SSID and password, so a multi-AP roaming network may be configured.

However, due to various reasons, such as security, a special purpose, or a situation in which information related to a multi-AP roaming network configuration is not recognized, a case, in which a multi-AP roaming network is not configured, and instead each AP has a unique SSID and a unique password instead, may occur. In this case, inconvenience of having to connect each of the plurality of APs to new enrollees may occur. Alternatively, credential information of an AP transmitted by the configurator may not guarantee a secure connection to an optimal AP from the point of view of an enrollee.

Various embodiments may provide an electronic device for transmitting and receiving network configuration information and an operating method thereof in a DPP network.

Various embodiments may provide an electronic device for transmitting and receiving a plurality of network configuration information and an operating method thereof in a DPP network.

Various embodiments may provide an electronic device for transmitting and receiving network configuration information suitable for an enrollee and an operating method thereof in a DPP network.

Various embodiments may provide an electronic device for providing a condition for filtering network configuration information to be provided and an operating method thereof in a DPP network.

Various embodiments may provide an electronic device for providing a plurality of DPP configuration objects based on set conditions and an operating method thereof in a DPP network.

In various embodiments of the disclosure, an example of network configuration information may be a DPP configuration object.

Figure 9A:
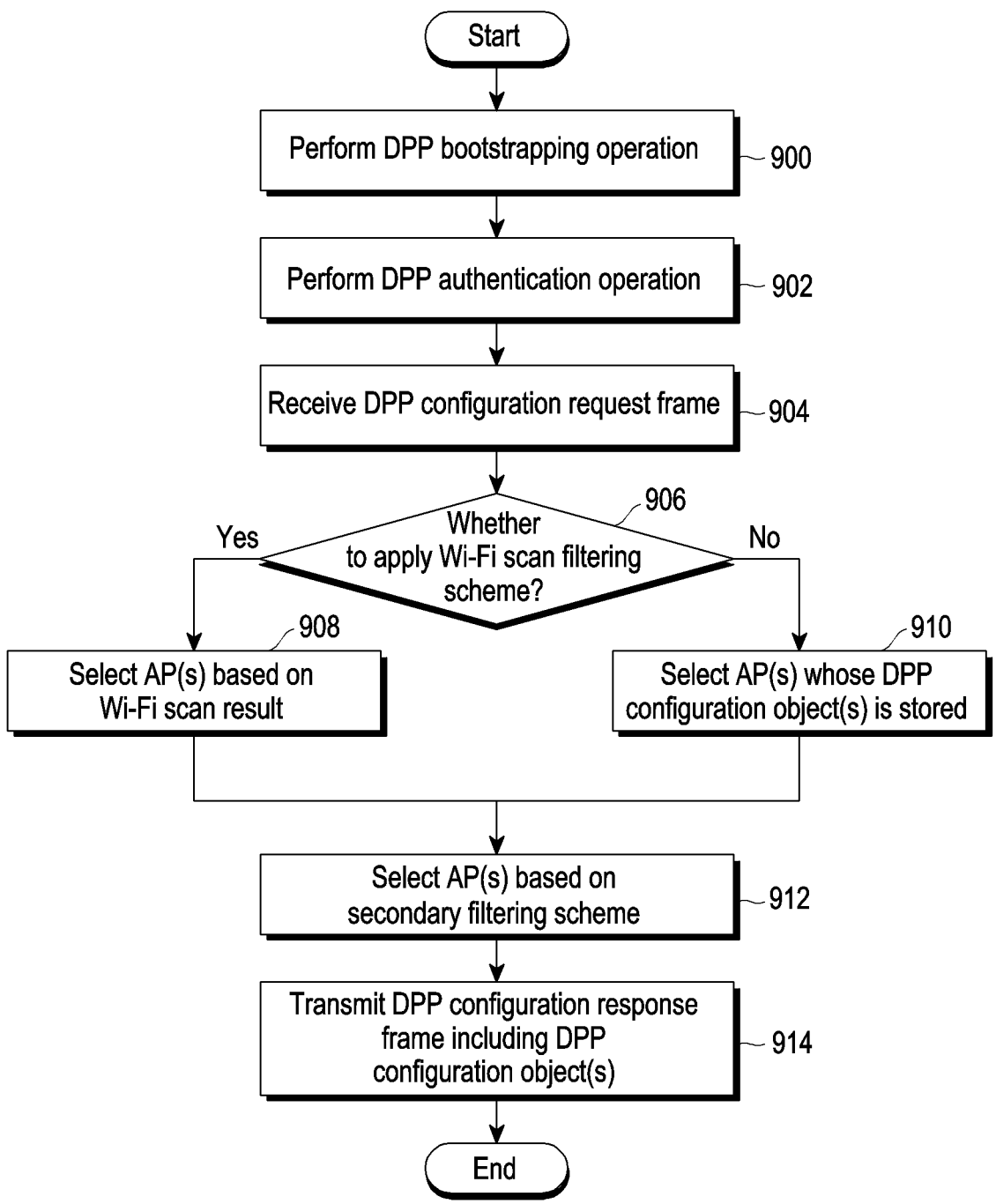
FIG. 9A is a flowchart schematically illustrating an operation for providing a DPP configuration object in a DPP network according to an embodiment of the disclosure.

FIG. 9A is a flowchart schematically illustrating an operation of providing a DPP configuration object in a DPP network according to an embodiment of the disclosure.

Referring to FIG. 9A, in operation 900, an electronic device (e.g., an electronic device 101 in FIG. 1) may perform a DPP bootstrapping operation with an external electronic device (e.g., an electronic device 102 or an electronic device 104 in FIG. 1). In FIG. 9A, it will be assumed that the electronic device operates as a configurator and the external electronic device operates as an enrollee. A DPP bootstrapping operation performed between a configurator and an enrollee has been described in FIG. 7, so a description of the DPP bootstrapping operation performed between the electronic device and the external electronic device will be omitted.

In operation 902, the electronic device may perform a DPP authentication operation with the external electronic device. A DPP authentication operation performed between the configurator and the enrollee has been described in FIG. 7, so a description of the DPP authentication operation performed between the electronic device and the external electronic device will be omitted.

In operation 904, as the DPP authentication operation is completed, the electronic device may receive a DPP configuration request frame from the external electronic device. In an embodiment of the disclosure, the DPP configuration request frame may be a message for requesting network configuration information, e.g., a DPP configuration object. In an embodiment of the disclosure, the DPP configuration request frame may include {E-nonce, configRequest}$_{ke}$ as described in FIG. 7. In an embodiment of the disclosure, E-nonce may represent an E-nonce attribute, configRequest may represent a DPP configuration request object attribute, and ke may represent an encryption key. In an embodiment of the disclosure, {E-nonce, configRequest}$_{ke}$ may represent E-nonce and configRequest which are encrypted with ke.

Upon receiving the DPP configuration request frame, the electronic device may determine whether to apply a Wi-Fi scan filtering scheme in operation 906. In an embodiment of the disclosure, the Wi-Fi scan filtering scheme may be a scheme of selecting at least one AP for which a DPP configuration object will be provided based on a Wi-Fi scan result and providing the DPP configuration object which corresponds to the selected at least one AP. In an embodiment of the disclosure, a Wi-Fi scan result used in the Wi-Fi scan filtering scheme may be a Wi-Fi scan result for a Wi-Fi scan operation performed by the configurator, e.g., the electronic device, or a Wi-Fi scan result for a Wi-Fi scan operation performed by the enrollee, e.g., the external electronic device. In an embodiment of the disclosure, the Wi-Fi scan result may include information, e.g., an AP ID or an AP address, about each of scanned APs.

According to an embodiment of the disclosure, in operation 906, the electronic device may determine whether to apply the Wi-Fi scan filtering scheme according to a network situation of the DPP network. In an embodiment of the disclosure, in operation 906, the electronic device may determine whether to apply the Wi-Fi scan filtering scheme based on an input provided through an upper layer, e.g., an application layer. For example, whether to apply the Wi-Fi scan filtering scheme may be selected through a UI.

Upon determining to apply the Wi-Fi scan filtering scheme in operation 906, the electronic device may select at least one AP for which a DPP configuration object is stored in the electronic device among the scanned APs based on the Wi-Fi scan result in operation 908. In an embodiment of the disclosure, it will be noted that the DPP configuration object includes a credential object, so it will be assumed that the DPP configuration object is stored if the credential object is stored. In an embodiment of the disclosure, if the Wi-Fi scan result is the Wi-Fi scan result of the electronic device, the scanned APs may be APs scanned by the Wi-Fi scan operation of the electronic device. In an embodiment of the disclosure, if the Wi-Fi scan result is the Wi-Fi scan result of the external electronic device, the scanned APs may be APs scanned by the Wi-Fi scan operation of the external electronic device. In an embodiment of the disclosure, the electronic device may store a credential list, and the credential list may include an AP ID and a credential object for each of a plurality of APs. In an embodiment of the disclosure, the electronic device may detect at least one AP ID included in the credential list of the electronic device from among AP IDs included in the Wi-Fi scan result, and select at least one AP which corresponds to the detected at least one AP ID.

Contrary to this, upon determining not to apply the Wi-Fi scan filtering scheme in operation 906, the electronic device may select at least one AP among a plurality of APs for which DPP configuration objects are stored in the electronic device in operation 910.

In operation 912, the electronic device may select at least one AP for which a DPP configuration object will be provided by applying a secondary filtering scheme to the selected at least one AP. In an embodiment of the disclosure, the secondary filtering scheme may be a scheme for selecting at least one AP for which a DPP configuration object will be provided based on at least one condition and providing the DPP configuration object which corresponds to the selected at least one AP. In an embodiment of the disclosure, the secondary filtering scheme may or may not be applied as needed, and the secondary filtering scheme will be described below, so a detailed description thereof will be omitted herein.

In operation 914, the electronic device may include the DPP configuration object for the selected at least one AP in a DPP configuration response frame, and transmit the DPP configuration response frame including the DPP configuration object to the external electronic device. In an embodiment of the disclosure, the DPP configuration response frame may be a message including network configuration information, e.g., the DPP configuration object.

According to an embodiment of the disclosure, although the operation of determining whether to apply the Wi-Fi scan filtering scheme by the electronic device has been described in FIG. 9A, at least one DPP configuration object may be provided in a form in which the Wi-Fi scan filtering scheme is applied without performing the operation of determining whether to apply the Wi-Fi scan filtering scheme, or in a form in which the Wi-Fi scan filtering scheme is not applied. According to an embodiment of the disclosure, whether to apply the Wi-Fi scan filtering scheme or whether to apply the secondary filtering scheme may be preset in a DPP device, e.g., the electronic device or the external electronic device, or may be set through an upper layer, e.g., an application layer if necessary. For example, whether to apply the Wi-Fi scan filtering scheme or whether to apply the secondary filtering scheme may be selected through a UI.

In an embodiment of the disclosure, the Wi-Fi scan filtering scheme may include at least one of a configurator-based Wi-Fi scan filtering scheme or an enrollee-based Wi-Fi scan filtering scheme. The configurator-based Wi-Fi scan filtering scheme may represent a Wi-Fi scan filtering scheme which is based on a Wi-Fi scan result for a Wi-Fi scan operation performed by the configurator. The enrollee-based Wi-Fi scan filtering scheme may represent a Wi-Fi scan filtering scheme which is based on a Wi-Fi scan result for a Wi-Fi scan operation performed by the enrollee.

Figure 9B:
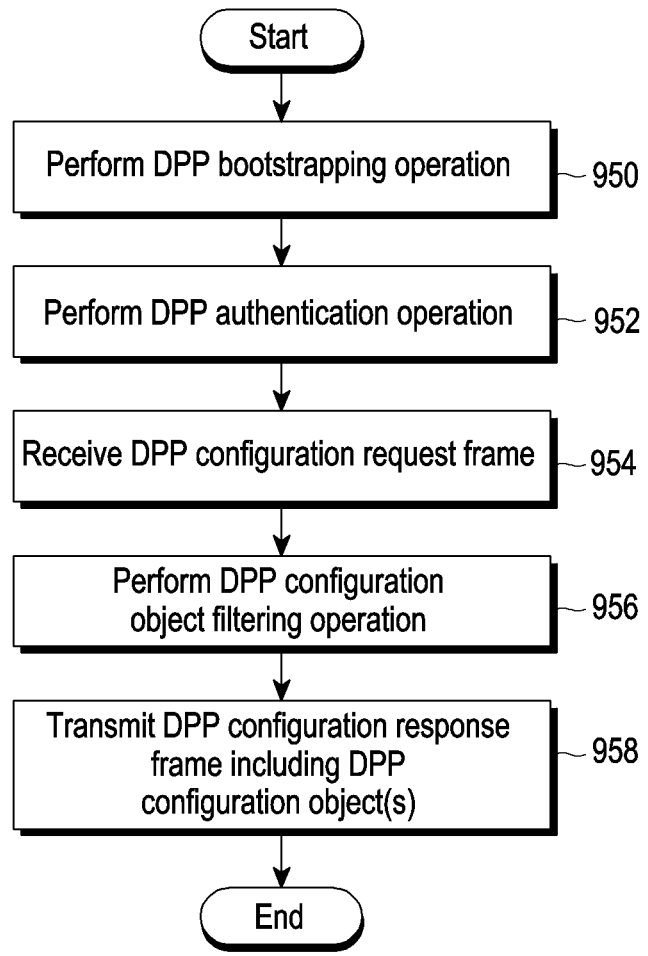
FIG. 9B is a flowchart schematically illustrating an operation for providing a DPP configuration object in a DPP network according to an embodiment of the disclosure.

FIG. 9B is a flowchart schematically illustrating another example of an operation of providing a DPP configuration object in a DPP network according to an embodiment of the disclosure.

Referring to FIG. 9B, in operation 950, an electronic device (e.g., an electronic device 101 in FIG. 1) may perform a DPP bootstrapping operation with an external electronic device (e.g., an electronic device 102 or an electronic device 104 in FIG. 1). In FIG. 9B, it will be assumed that the electronic device operates as a configurator and the external electronic device operates as an enrollee. A DPP bootstrapping operation performed between a configurator and an enrollee has been described in FIG. 7, so a description of the DPP bootstrapping operation performed between the electronic device and the external electronic device will be omitted.

In operation 952, the electronic device may perform a DPP authentication operation with the external electronic device. A DPP authentication operation performed between the configurator and the enrollee has been described in FIG. 7, so a description of the DPP authentication operation performed between the electronic device and the external electronic device will be omitted.

In operation 954, as the DPP authentication operation is completed, the electronic device may receive a DPP configuration request frame from the external electronic device. In an embodiment of the disclosure, the DPP configuration request frame may be a message for requesting network configuration information, e.g., a DPP configuration object. In an embodiment of the disclosure, the DPP configuration request frame may include {E-nonce, configRequest}$_{ke}$ as described in FIG. 7. In an embodiment of the disclosure, E-nonce may represent an E-nonce attribute, configRequest may represent a DPP configuration request object attribute, and ke may represent an encryption key. In an embodiment of the disclosure, {E-nonce, configRequest}$_{ke}$ may represent E-nonce and configRequest which are encrypted with ke.

Upon receiving the DPP configuration request frame, the electronic device may perform a DPP configuration object filtering operation in operation 956. In an embodiment of the disclosure, the DPP configuration object filtering operation may mean an operation of selecting at least one DPP configuration object by applying set at least one filtering scheme to at least one DPP configuration object stored in the configurator. In an embodiment of the disclosure, a DPP configuration object includes a credential object, so the DPP configuration object filtering operation may also be referred to as a credential filtering operation.

In an embodiment of the disclosure, at least one filtering scheme used for the DPP configuration object filtering operation may include at least one of a Wi-Fi scan filtering scheme or a secondary filtering scheme. The Wi-Fi scan filtering scheme and the secondary filtering scheme have been described above, so a detailed description thereof will be omitted herein.

In an embodiment of the disclosure, the Wi-Fi scan filtering scheme may include at least one of a configurator-based Wi-Fi scan filtering scheme or an enrollee-based Wi-Fi scan filtering scheme. The configurator-based Wi-Fi scan filtering scheme and the enrollee-based Wi-Fi scan filtering scheme have been described above, so a detailed description thereof will be omitted herein.

In operation 958, the electronic device may include a DPP configuration object for at least one AP selected through the DPP configuration object filtering operation in a DPP configuration response frame, and transmit the DPP configuration response frame including the DPP configuration object to the external electronic device. In an embodiment of the disclosure, the DPP configuration response frame may be a message including network configuration information, e.g., a DPP configuration object.

Figure 10:
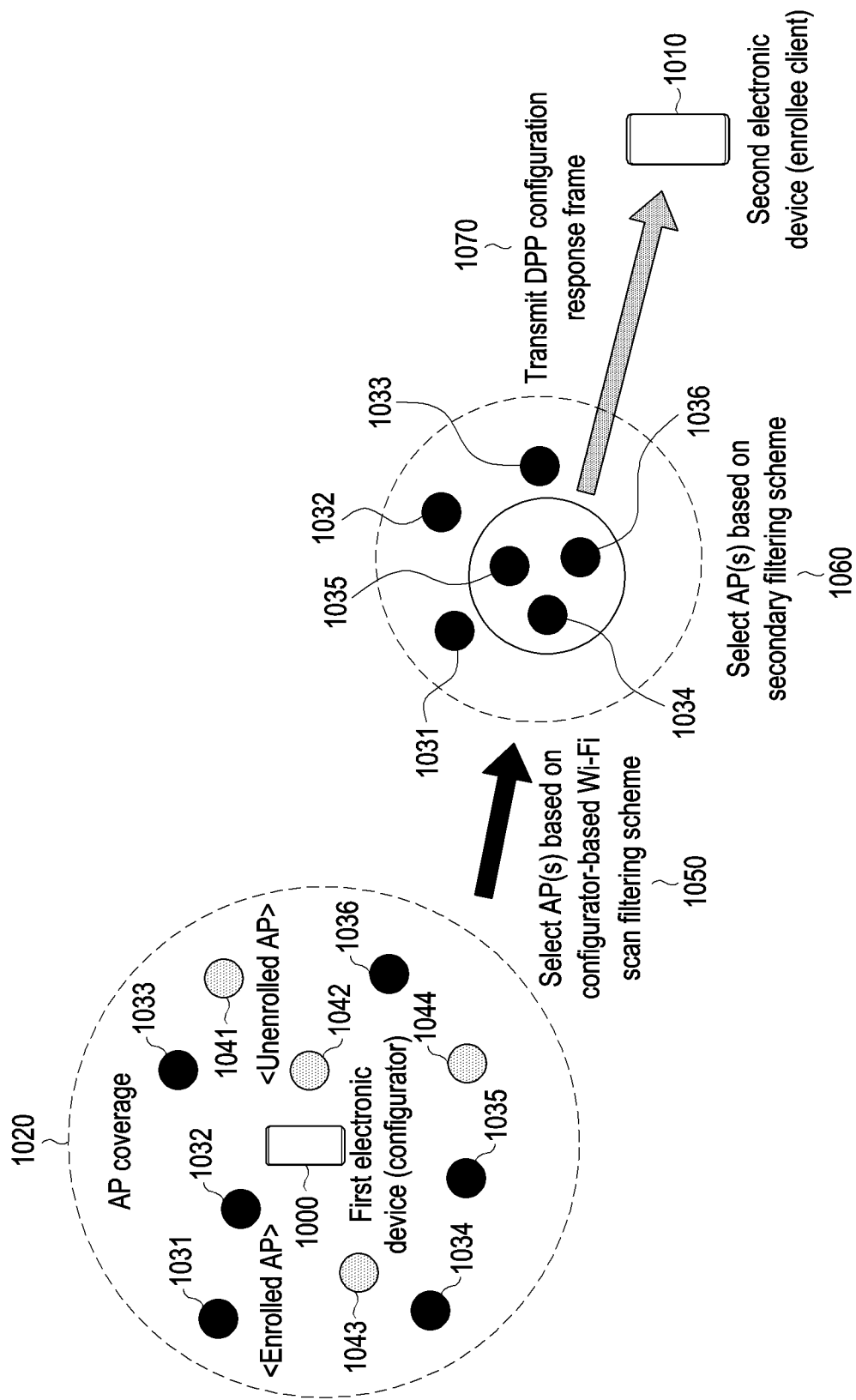
FIG. 10 is a diagram schematically illustrating an operation for providing a DPP configuration object based on a configurator based-Wi-Fi scan filtering scheme and a secondary filtering scheme in a DPP network according to an embodiment of the disclosure.

FIG. 10 is a diagram schematically illustrating an operation for providing a DPP configuration object based on a configurator based-Wi-Fi scan filtering scheme and a secondary filtering scheme in a DPP network according to an embodiment of the disclosure.

Referring to FIG. 10, the DPP network may include a plurality of electronic devices, e.g., an electronic device, e.g., a first electronic device 1000, and an external electronic device, e.g., a second electronic device 1010. The DPP network may include other external electronic devices, e.g., a third electronic device 1031 to a twelfth electronic device 1044. In FIG. 10, each of the first electronic device 1000 to the twelfth electronic device 1044 may be a DPP device, and it will be assumed that the first electronic device 1000 operates as a configurator, the second electronic device 1010 operates as an enrollee client, and each of the third electronic device 1031 to the twelfth electronic device 1044 operates as an AP.

In an embodiment of the disclosure, the first electronic device 1000 (e.g., an electronic device 101 in FIG. 1) may perform a Wi-Fi scan operation to detect APs within an AP coverage 1020. In an embodiment of the disclosure, the AP coverage 1020 may be a Wi-Fi coverage in which a configurator, e.g., the first electronic device 1000 is capable of detecting APs. In an embodiment of the disclosure, a time point at which the first electronic device 1000 starts performing the Wi-Fi scan operation for detecting APs may be an arbitrary time point within a time period from before the first electronic device 1000 performs a DPP bootstrapping operation with the second electronic device 1010 (e.g., an electronic device 102 or electronic device 104 in FIG. 1) to before the first electronic device 1000 transmits a DPP configuration response frame. However, it will be noted that this is only an example, and the time point at which the first electronic device 1000 starts performing the Wi-Fi scan operation is not necessarily limited thereto.

As the first electronic device 1000 performs a Wi-Fi scan operation, a plurality of APs may be detected within the AP coverage 1020. A case is shown in FIG. 10 where, as the first electronic device 1000 performs the Wi-Fi scan operation, for example, ten APs, e.g., a first AP 1031, a second AP 1032, a third AP 1033, a fourth AP 1034, a fifth AP 1035, a sixth AP 1036, a seventh AP 1041, an eighth AP 1042, a ninth AP 1043, and a tenth AP 1044 are detected within the AP coverage 1020. It will be assumed that among the detected ten APs, six APs, e.g., the first AP 1031, the second AP 1032, the third AP 1033, the fourth AP 1034, the fifth AP 1035, and the sixth AP 1036 are APs which are enrolled in the first electronic device 1000, and remaining four APs, e.g., the seventh AP 1041, the eighth AP 1042, the ninth AP 1043, and the tenth AP 1044 are APs which are not enrolled in the first electronic device 1000. In an embodiment of the disclosure, the first electronic device 1000 may store a secure credential for each of enrolled APs.

According to an embodiment of the disclosure, in operation 1050, if the first electronic device 1000 receives a DPP configuration request frame from the second electronic device 1010, the first electronic device 1000 may select at least one AP whose AP ID is included in a credential list stored by the first electronic device 1000 among the plurality of APs detected according to the Wi-Fi scan operation. In an embodiment of the disclosure, the first electronic device 1000 may select at least one AP by applying a configurator-based Wi-Fi scan filtering scheme. In FIG. 10, the ten APs are detected according to the Wi-Fi scan operation, and among them, the six APs are enrolled in the first electronic device 1000, so the six APs may be selected.

According to an embodiment of the disclosure, in operation 1060, the first electronic device 1000 may select, by applying a secondary filtering scheme, at least one AP among the at least one AP which is selected by applying the configurator-based Wi-Fi scan filtering scheme. In an embodiment of the disclosure, the secondary filtering scheme may include at least one of the following conditions.

(1) Condition 1

All APs to which a secondary filtering scheme is applied may be selected.

(2) Condition 2

Among APs to which a secondary filtering scheme is applied, at least one AP having a record of access by a configurator within a set period from a time point at which the secondary filtering scheme is applied may be selected. In an embodiment of the disclosure, the set period may be changed according to a network situation of a DPP network or according to selection of the configurator.

(3) Condition 3

At least one AP existing within a set distance from a configurator among APs to which a secondary filtering scheme is applied may be selected. In an embodiment of the disclosure, a distance between the configurator and a specific AP may be detected based on round trip time (RTT). In an embodiment of the disclosure, the distance between the configurator and the specific AP may be detected based on location information of the configurator and location information of the specific AP. In an embodiment of the disclosure, it will be noted that the distance between the configurator and the specific AP may be detected based on various parameters as well as the RTT or the location information.

(4) Condition 4

At least one AP selected through an upper layer, e.g., an application layer, among APs to which a secondary filtering scheme is applied may be selected. In an embodiment of the disclosure, if a configurator outputs information about the APs to which the secondary filtering scheme is applied through a UI, and an input indicating selection of at least one AP among the APs to which the secondary filtering scheme is applied is detected through the UI, the at least one AP which corresponds to the corresponding input may be selected. In an embodiment of the disclosure, if the configurator outputs the information about the APs to which the secondary filtering scheme is applied on a map through the UI, and the input indicating the selection of the at least one AP among the APs is detected through the UI, the at least one AP which corresponds to the corresponding input may be selected. In an embodiment of the disclosure, the information about the APs outputted on the map through the UI may be information about APs existing within a first distance from the configurator, information about APs which exist beyond the first distance from the configurator, but exist within a second distance from the configurator, or information about APs which exist beyond the second distance from the configurator. In an embodiment of the disclosure, information about the first distance and the second distance may be inputted through the UI. In an embodiment of the disclosure, the information about the APs outputted on the map through the UI may be based on location information inputted through the UI regardless of a location of the configurator. For example, the information about the APs outputted on the map through the UI may be information about APs existing within the first distance from a location which corresponds to the location information inputted through the UI, information about APs which exist beyond the first distance from the corresponding location, but exist within the second distance from the corresponding location, or information about APs which exist beyond the second distance from the corresponding location.

(5) Condition 5

At least one AP may be selected based on channel quality among APs to which a secondary filtering scheme is applied. In an embodiment of the disclosure, at least one AP whose channel quality is good may be selected among the APs to which the secondary filtering scheme is applied. In an embodiment of the disclosure, a case that channel quality is good may mean that channel quality of a received signal received from a corresponding AP is greater than or equal to threshold quality. In an embodiment of the disclosure, parameters indicating channel quality may include at least one of a received signal strength indicator (RSSI), a channel quality indicator (CQI), a signal to noise ratio (SNR), a signal to interference ratio (SIR), a signal to interference and noise ratio (SINR), reference signal received power (RSRP), or reference signal received quality (RSRQ), and/or the like. In an embodiment of the disclosure, at least one AP whose RSSI value is greater than or equal to or a threshold value among the APs to which the secondary filtering scheme is applied may be selected.

(6) Condition 6

At least one AP may be selected based on network quality among APs to which a secondary filtering scheme is applied. In an embodiment of the disclosure, the network quality may be determined by whether the Internet is available. In an embodiment of the disclosure, a configurator may select at least one AP in which the Internet is available among the APs to which the secondary filtering scheme is applied.

(7) Condition 7

Among APs to which a secondary filtering scheme is applied, at least one AP which exists within a set distance from a configurator and has a record of access by the configurator within a set period from a time point at which the secondary filtering scheme is applied may be selected. A distance between the configurator and a specific AP has been described in Condition 3, so a detailed description thereof will be omitted herein. In an embodiment of the disclosure, the set period may be changed according to a network situation of a DPP network or according to selection of the configurator.

(8) Condition 8

Among APs to which a secondary filtering scheme is applied, at least one AP selected through an upper layer, e.g., an application layer among APs existing within a set distance from a configurator may be selected. In an embodiment of the disclosure, the configurator may output information about APs existing within a set distance from the configurator among the APs to which the secondary filtering scheme is applied through a UI, and if an input indicating selection of at least one AP among the APs existing within the set distance from the configurator is detected through the UI, the configurator may select at least one AP which corresponds to the corresponding input.

In an embodiment of the disclosure, it will be noted that various conditions other than Conditions 1 to 8 may be included in the secondary filtering scheme, and the secondary filtering scheme is not limited to including only Conditions 1 to 8. In an embodiment of the disclosure, at least two of Conditions 1 to 8 may be combined to be a new condition.

According to an embodiment of the disclosure, in operation 1070, the first electronic device 1000 may include a DPP configuration object including a credential object for each of the at least one AP selected by applying the secondary filtering scheme in a DPP configuration response frame, and transmit, to the second electronic device 1010, the DPP configuration response frame including a DPP configuration object for each of the at least one AP.

In an embodiment of the disclosure, the first electronic device 1000 may select the fourth AP 1034, the fifth AP 1035, and the sixth AP 1036 by applying the secondary filtering scheme to the APs, e.g., the first AP 1031, the second AP 1032, the third AP 1033, the fourth AP 1034, the fifth AP 1035, and the sixth AP 1036, which are selected based on the configurator-based Wi-Fi scan filtering scheme. The first electronic device 1000 may include a DPP configuration object including a credential object for each of the selected fourth AP 1034, fifth AP 1035, and sixth AP 1036 in a DPP configuration response frame, and transmit, to the second electronic device 1010, the DPP configuration response frame including a DPP configuration object for each of the fourth AP 1034, the fifth AP 1035, and the sixth AP 1036.

Figure 11:
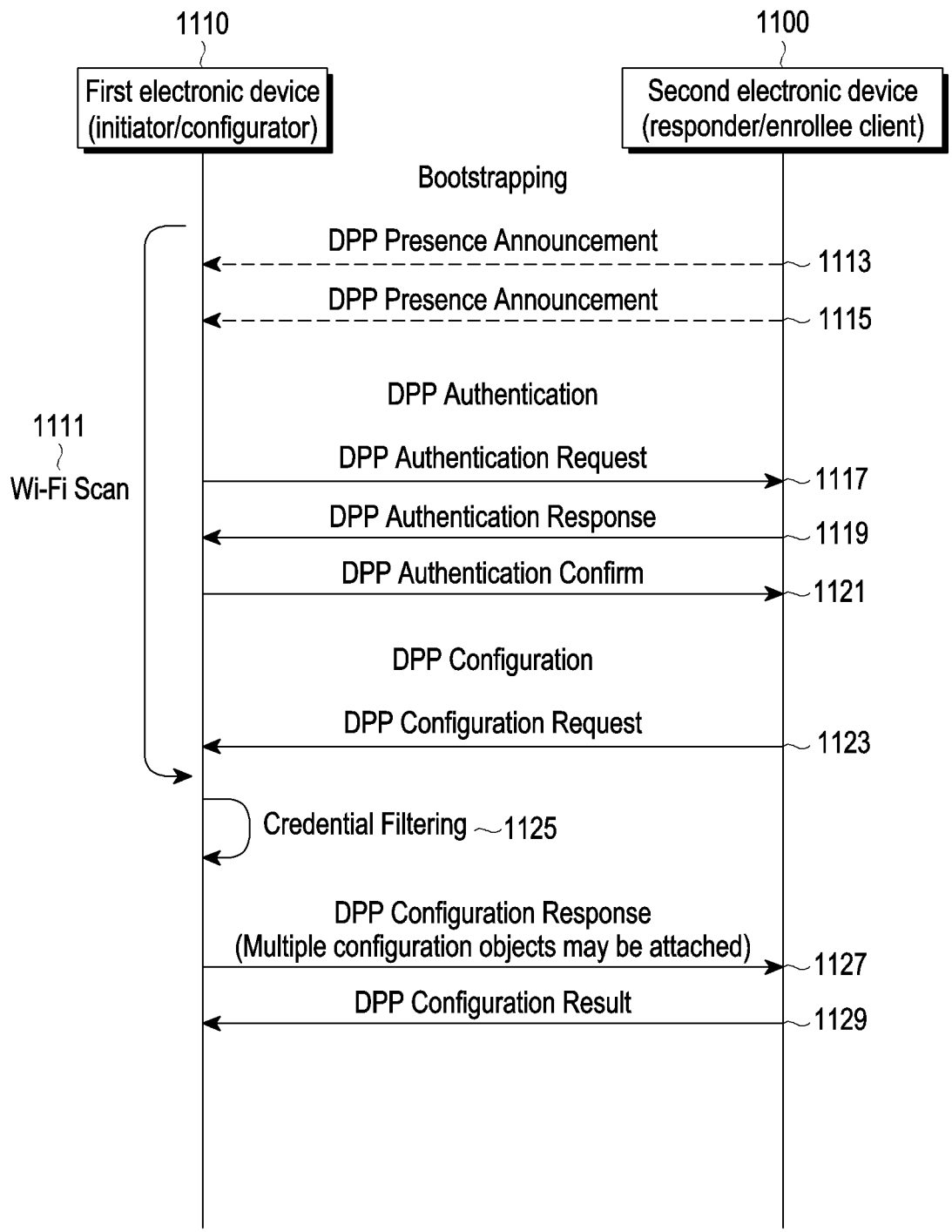
FIG. 11 is a signal flow diagram schematically illustrating an operation for providing a DPP configuration object based on a configurator based-Wi-Fi scan filtering scheme and a secondary filtering scheme in a DPP network according to an embodiment of the disclosure.

FIG. 11 is a signal flow diagram schematically illustrating an operation for providing a DPP configuration object based on a configurator based-Wi-Fi scan filtering scheme and a secondary filtering scheme in a DPP network according to an embodiment of the disclosure.

Referring to FIG. 11, each of an electronic device (e.g., a first electronic device 1110) and an external electronic device (e.g., a second electronic device 1100) may be a DPP device, and it will be assumed that the first electronic device 1110 operates as both a configurator and an initiator, and the second electronic device 1100 operates as both an enrollee client registrant and a responder.

In operation 1113, the second electronic device 1100 which operates as both the enrollee client and the responder may transmit a DPP presence announcement frame. In an embodiment of the disclosure, a hash for the DPP presence announcement frame may be SHA256 ("chirp" | $B_R$). In an embodiment of the disclosure, $B_R$ may represent a public bootstrapping key of the second electronic device 1100. In an embodiment of the disclosure, the DPP presence announcement frame may be similar to a DPP presence announcement frame described in FIG. 7. In an embodiment of the disclosure, the second electronic device 1100 may perform a listening operation on a specified channel during a DPP bootstrapping operation. The first electronic device 1110 which operates as both the configurator and the initiator may obtain bootstrapping information from the second electronic device 1100 by using an OOB mechanism, e.g., QR code scan, NFC tap, or BLE exchange. In an embodiment of the disclosure, the bootstrapping information may include a public bootstrapping key ($B_R$), a global operating class channel, and/or a channel list of the second electronic device 1100 for DPP authentication. During the DPP bootstrapping operation, the second electronic device 1100 may selectively announce existence of the second electronic device 1100 to help the first electronic device 1110 to discover the second electronic device 1100. In an embodiment of the disclosure, in operation 1115, the second electronic device 1100 may transmit a DPP presence announcement frame. For example, the second electronic device 1100 may periodically transmit a DPP presence announcement frame.

According to an embodiment of the disclosure, the first electronic device 1110 may start operating on a channel which is based on channel information received during a DPP bootstrapping operation by broadcasting a DPP authentication request frame. For example, the first electronic device 1110 may broadcast the DPP authentication request frame in operation 1117. In an embodiment of the disclosure, the DPP authentication request frame may include SHA256 ($B_R$), SHA256 ($B_I$), $P_I$, and {I-nonce, I-capabilities}$_{k1}$. For example, SHA256 ($B_R$) may represent a SHA256 hash for $B_R$, $B_I$ may represent a public bootstrapping key of the first electronic device 1110, SHA256 ($B_I$) may represent a SHA256 hash for $B_I$, $P_I$ may represent a public protocol key of the first electronic device 1110, I-nonce may represent an initiator nonce attribute, I-capabilities may represent an initiator capabilities attribute, and k1 may represent a first intermediate key. In an embodiment of the disclosure, at least one of a hash for a public bootstrapping key of the second electronic device 1100, the hash for the public bootstrapping key of the first electronic device 1110, the public protocol key of the first electronic device 1110, or the initiator nonce attribute and the initiator capabilities attribute which are encrypted with the first intermediate key included in the DPP authentication request frame may be secure information used in a DPP authentication operation.

According to an embodiment of the disclosure, if the first electronic device 1110 broadcasts the DPP authentication request frame and the second electronic device 1100 successfully receives this DPP authentication request frame, the second electronic device 1100 may match H($B_R$) which is a hash function value for $B_R$. In operation 1119, the second electronic device 1100 may transmit, to the first electronic device 1110, a DPP authentication response frame which is a response frame to the DPP authentication request frame. In an embodiment of the disclosure, the DPP authentication response frame may include a DPP status field, SHA256 ($B_R$), [SHA256 ($B_I$)], $P_R$, and {R-nonce, I-nonce, R-capabilities, {R-auth}$_{ke}$}$_{k2}$. In an embodiment of the disclosure, $P_R$ may represent a public protocol key of the second electronic device 1100, R-nonce may represent a responder nonce attribute, R-capabilities may represent a responder capabilities attribute, R-auth may represent an authentication tag of the responder, for example, the second electronic device 1100, ke may represent an encryption key, k2 may represent a second intermediary key, and [ ] may represent a value optionally present. For example, [SHA256 ($B_I$)] may be optionally included in the DPP authentication response frame or may be included in the DPP authentication response frame if a specific condition is satisfied. In an embodiment of the disclosure, at least one of the hash for the public bootstrapping key of the second electronic device 1100, the hash for the public bootstrapping key of the first electronic device 1110, the public protocol key of the second electronic device 1100, or the responder nonce attribute, the responder capabilities attribute, and the authentication tag of the responder which are encrypted with the second intermediate key included in the DPP authentication response frame may be secure information used in the DPP authentication operation. The DPP status field has been described in Table 1, so a detailed description thereof will be omitted herein.

In operation 1121, the first electronic device 1110 receiving the DPP authentication response frame from the second electronic device 1100 may transmit a DPP authentication confirm frame to the second electronic device 1100. In an embodiment of the disclosure, the DPP authentication confirm frame may include a DPP status field, SHA256 ($B_R$), [SHA256 ($B_R$)], and {I-auth}$_{ke}$. In an embodiment of the disclosure, I-auth may represent an authenticating tag of the first electronic device 1110, and ke may represent an encryption key.

In operation 1123, the second electronic device 1100 receiving the DPP authentication confirm frame from the first electronic device 1110 may transmit a DPP configuration request frame to the first electronic device 1110. In an embodiment of the disclosure, the DPP configuration request frame may include {E-nonce, configuration attributes}$_{ke}$. In an embodiment of the disclosure, E-nonce may represent an E-nonce attribute, and configuration attributes may represent configuration attribute objects. A configuration attribute object may include at least one of a device name attribute, a Wi-Fi technology attribute, or a network role attribute. In an embodiment of the disclosure, the DPP configuration request frame may be a message for requesting network configuration information, e.g., a DPP configuration object.

Upon receiving the DPP configuration request frame from the second electronic device 1100, the first electronic device 1110 may perform a DPP configuration object filtering operation in operation 1125. In an embodiment of the disclosure, the DPP configuration object filtering operation may mean an operation of selecting at least one DPP configuration object by applying set at least one filtering scheme to at least one DPP configuration object stored in the configurator. In an embodiment of the disclosure, a DPP configuration object includes a credential object, so the DPP configuration object filtering operation may also be referred to as a credential filtering operation.

In an embodiment of the disclosure, at least one filtering scheme used for the DPP configuration object filtering operation may include at least one of a Wi-Fi scan filtering scheme or a secondary filtering scheme. In an embodiment of the disclosure, the Wi-Fi scan filtering scheme may include at least one of a configurator-based Wi-Fi scan filtering scheme or an enrollee-based Wi-Fi scan filtering scheme. The Wi-Fi scan filtering scheme and the secondary filtering scheme have been described above, so a detailed description thereof will be omitted herein. In an embodiment of the disclosure, in operation 1125, it will be assumed that the first electronic device 1110 performs the DPP configuration object filtering operation by applying the configurator-based Wi-Fi scan filtering scheme and the secondary filtering scheme as described in FIG. 10.

In an embodiment of the disclosure, the first electronic device 1110 may perform a Wi-Fi scan operation to detect APs within an AP coverage in operation 1111. In an embodiment of the disclosure, the AP coverage may be a Wi-Fi coverage in which the first electronic device 1100 is capable of detecting APs. In an embodiment of the disclosure, a time point at which the first electronic device 1110 starts performing the Wi-Fi scan operation may be an arbitrary time point within a time period from before the first electronic device 1110 performs a DPP bootstrapping operation with the second electronic device 1100 to before the first electronic device 1110 transmits a DPP configuration response frame. However, it will be noted that this is only an example, and the time point at which the first electronic device 1110 starts to perform the Wi-Fi scan operation is not limited thereto. The first electronic device 1110 may select at least one AP whose AP ID is included in a credential list stored by the first electronic device 1110 among a plurality of APs detected through the Wi-Fi scan operation in operation 1111. For example, referring to FIG. 10, in FIG. 11, it will be assumed that the number of APs detected according to the Wi-Fi scan operation is 10, and among them, the number of APs enrolled in the first electronic device 1110, e.g., APs which may correspond to AP IDs included in the credential list of the first electronic device 1110 is 6. In this case, the six APs enrolled in the first electronic device 1110 may be selected among the ten APs detected through the Wi-Fi scan operation performed as the configurator-based Wi-Fi scan filtering scheme is applied.

In an embodiment of the disclosure, the first electronic device 1110 may apply the secondary filtering scheme to the six APs selected by applying the configurator-based Wi-Fi scan filtering scheme to finally select at least one AP for which a DPP configuration object will be provided in operation 1125. Conditions which the secondary filtering scheme may include have been described in FIG. 10, so a detailed description thereof will be omitted herein. In an embodiment of the disclosure, with reference to FIG. 10, it will be assumed that the first electronic device 1110 finally selects three APs by applying the secondary filtering scheme.

In operation 1127, the first electronic device 1110 may transmit, to the second electronic device 1100, a DPP configuration response frame which is a response to the DPP configuration request frame. In an embodiment of the disclosure, the DPP configuration response frame may include DPP configuration objects for the three selected APs. Accordingly, the DPP configuration response frame may include a DPP status field and {E-nonce, configuration object, configuration object, configuration object}$_{ke}$. Each of the three DPP configuration objects may be JSON-encoded.

In operation 1129, the second electronic device 1100 receiving the DPP configuration response frame may transmit a DPP configuration result frame to the first electronic device 1110. In an embodiment of the disclosure, the DPP configuration result frame may include {DPP Status, E-nonce}$_{ke}$. Although not separately shown in FIG. 11, thereafter, the second electronic device 1100 may select an AP suitable for the second electronic device 1100 by performing a DPP access operation based on the DPP configuration object received through the DPP configuration response frame, and establish a secure connection with the selected AP. In an embodiment of the disclosure, the three DPP configuration objects are received through the DPP configuration response frame, the second electronic device 1100 may select one AP suitable for the second electronic device 1100 based on the three DPP configuration objects, and establish a secure connection with the selected AP. A criterion for the second electronic device 1100 to select an AP with which the second electronic device 1100 will establish a secure connection may be implemented in various forms.

Figure 12:
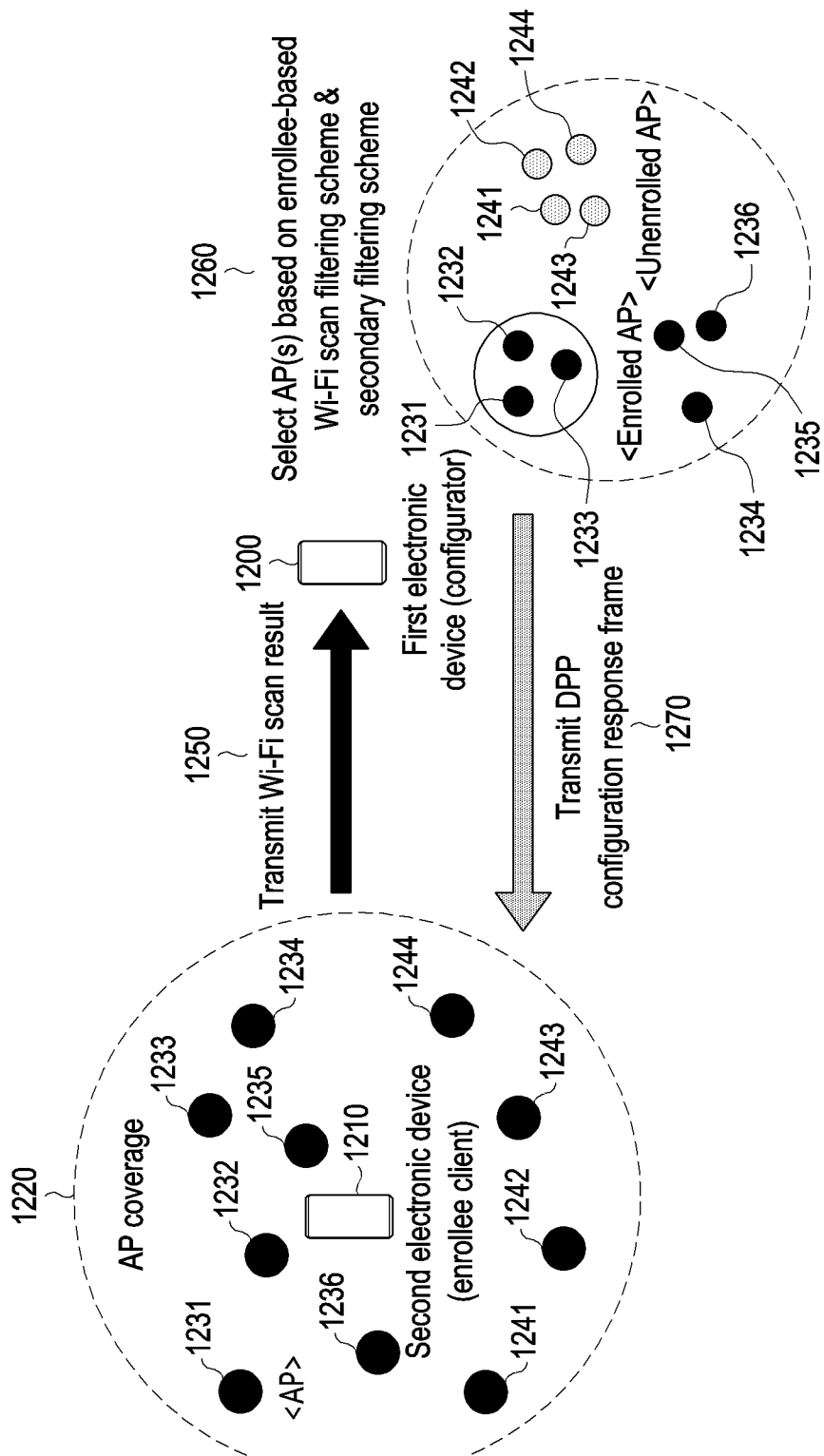
FIG. 12 is a diagram schematically illustrating an operation for providing a DPP configuration object based on an enrollee based-Wi-Fi scan filtering scheme and a secondary filtering scheme in a DPP network according to an embodiment of the disclosure.

FIG. 12 is a diagram schematically illustrating an operation for providing a DPP configuration object based on an enrollee based-Wi-Fi scan filtering scheme and a secondary filtering scheme in a DPP network according to an embodiment of the disclosure.

Referring to FIG. 12, the DPP network may include a plurality of electronic devices, e.g., an electronic device (e.g., a first electronic device 1200), and an external electronic device (e.g., a second electronic device 1210). The DPP network may include other external electronic devices, e.g., a third electronic device 1231 to a twelfth electronic device 1244. In FIG. 12, each of the first electronic device 1200 to the twelfth electronic device 1244 may be a DPP device, and it will be assumed that the first electronic device 1200 operates as a configurator, the second electronic device 1210 operates as an enrollee client, and each of the third electronic device 1231 to the twelfth electronic device 1244 operates as an AP.

In an embodiment of the disclosure, after completing a DPP bootstrapping operation and a DPP authentication operation with the first electronic device 1200 (e.g., an electronic device 101 in FIG. 1), for example, after receiving a DPP authentication confirmation frame from the first electronic device 1200, the second electronic device 1210 (e.g., an electronic device 102 or an electronic device 104 in FIG. 1) may transmit a Wi-Fi scan result to the first electronic device 1200 in operation 1250. This will be described as follows.

In an embodiment of the disclosure, the second electronic device 1210 may perform a Wi-Fi scan operation to detect APs within an AP coverage 1220. In an embodiment of the disclosure, the AP coverage 1220 may be a Wi-Fi coverage in which the second electronic device 1210 is capable of detecting APs. In an embodiment of the disclosure, a time point at which the second electronic device 1210 starts performing the Wi-Fi scan operation for detecting APs may be an arbitrary time point within a time period from before second first electronic device 1210 performs a DPP bootstrapping operation with the first electronic device 1200 to before the second electronic device 1210 transmits a DPP configuration request frame. However, it will be noted that this is only an example, and the time point at which the second electronic device 1210 starts performing the Wi-Fi scan operation is not necessarily limited thereto.

As the second electronic device 1210 performs a Wi-Fi scan operation, a plurality of APs may be detected within the AP coverage 1220. A case is shown in FIG. 12 where, as the second electronic device 1210 performs the Wi-Fi scan operation, for example, ten APs, e.g., a first AP 1231, a second AP 1232, a third AP 1233, a fourth AP 1234, a fifth AP 1235, a sixth AP 1236, a seventh AP 1241, an eighth AP 1242, a ninth AP 1243, and a tenth AP 1244 are detected within the AP coverage 1220.

The second electronic device 1210 may transmit a Wi-Fi scan result for the ten detected APs to the first electronic device 1200 in operation 1250. In an embodiment of the disclosure, the second electronic device 1210 may transmit the Wi-Fi scan result to the first electronic device 1200 based on various schemes, and the schemes for transmitting the Wi-Fi scan result will be described below.

According to an embodiment of the disclosure, the second electronic device 1210 may transmit the Wi-Fi scan result to the first electronic device 1200 based on a vendor specific information element (VSIE). In an embodiment of the disclosure, the second electronic device 1210 may set a VSIE ID to transmit the Wi-Fi scan result, and include the Wi-Fi scan result in a VSIE which corresponds to the set VSIE ID to include the VSIE including the Wi-Fi scan result in a DPP configuration request frame. In an embodiment of the disclosure, a VSIE may be an information element (IE) which may be used for each vendor, and may be set differently for each vendor.

According to an embodiment of the disclosure, the second electronic device 1210 may transmit the Wi-Fi scan result to the first electronic device 1200 based on an action frame. In an embodiment of the disclosure, the second electronic device 1210 may transmit the Wi-Fi scan result through a separate action frame on a Wi-Fi channel used in a DPP provisioning process. Here, the action frame used for transmitting the Wi-Fi scan result may be one of action frames used in an existing DPP or may be a newly defined action frame.

According to an embodiment of the disclosure, the second electronic device 1210 may transmit the Wi-Fi scan result to the first electronic device 1200 in an OOB scheme. For example, the OOB scheme is a scheme of transmitting the Wi-Fi scan result by using other communication schemes, such as BLE or Bluetooth.

In an embodiment of the disclosure, it will be noted that the schemes for transmitting the Wi-Fi scan result are not limited to one of the schemes described above, and the Wi-Fi scan result may be transmitted in various schemes other than the schemes described above.

After transmitting the Wi-Fi scan result, the second electronic device 1210 may transmit a DPP configuration request frame to the first electronic device 1200. According to an embodiment of the disclosure, in operation 1260, as the first electronic device 1200 receives the DPP configuration request frame from the second electronic device 1210, the first electronic device 1200 may select at least one AP included in a credential list stored by the first electronic device 1200 based on the Wi-Fi scan result received from the second electronic device 1210. In an embodiment of the disclosure, the first electronic device 1200 may select at least one AP by applying the enrollee-based Wi-Fi scan filtering scheme.

In FIG. 12, it will be assumed that among the ten APs detected by the second electronic device 1210, six APs, e.g., the first AP 1231, the second AP 1232, the third AP 1233, the fourth AP 1234, the fifth AP 1235, and the sixth AP 1236 are APs which are enrolled in the first electronic device 1200, and remaining four APs, e.g., the seventh AP 1241, the eighth AP 1242, the ninth AP 1243, and the tenth AP 1244 are APs which are not enrolled in the first electronic device 1200. The first electronic device 1200 may store a secure credential for each of enrolled APs. The number of APs detected according to the Wi-Fi scan operation of the second electronic device 1210 is 10, and the number of APs which are enrolled in the first electronic device 1200 among them is 6, so the six APs may be selected.

According to an embodiment of the disclosure, in operation 1260, the first electronic device 1200 may select at least one AP by applying a secondary filtering scheme among the at least one AP selected by applying the enrollee-based Wi-Fi scan filtering scheme. In an embodiment of the disclosure, the secondary filtering scheme may include at least one of conditions, e.g., a condition 1, a condition 2, a condition 3, a condition 4, a condition 5, a condition 6, a condition 7, or a condition 8, as described in FIG. 10. The conditions 1 to 8 have been described in FIG. 10, so a detailed description thereof will be omitted herein.

According to an embodiment of the disclosure, in operation 1270, the first electronic device 1200 may include a DPP configuration object including a credential object for each of the at least one AP selected by applying the secondary filtering scheme in a DPP configuration response frame, and transmit, to the second electronic device 1210, the DPP configuration response frame including the DPP configuration object for each of the at least one AP.

In an embodiment of the disclosure, the first electronic device 1200 may select the first AP 1231, the second AP 1232, and the third AP 1233 by applying the secondary filtering scheme to the APs, e.g., the first AP 1231, the second AP 1232, the third AP 1233, the fourth AP 1234, the fifth AP 1235, and the sixth AP 1236 which are selected based on the enrollee-based Wi-Fi scan filtering scheme. The first electronic device 1200 may include a DPP configuration object including a credential object for each of the selected first AP 1231, second AP 1232, and third AP 1233 in a DPP configuration response frame, and transmit, to the second electronic device 1210, the DPP configuration response frame including the DPP configuration object for each of the first AP 1231, the second AP 1232, and the third AP 1233.

Figure 13:
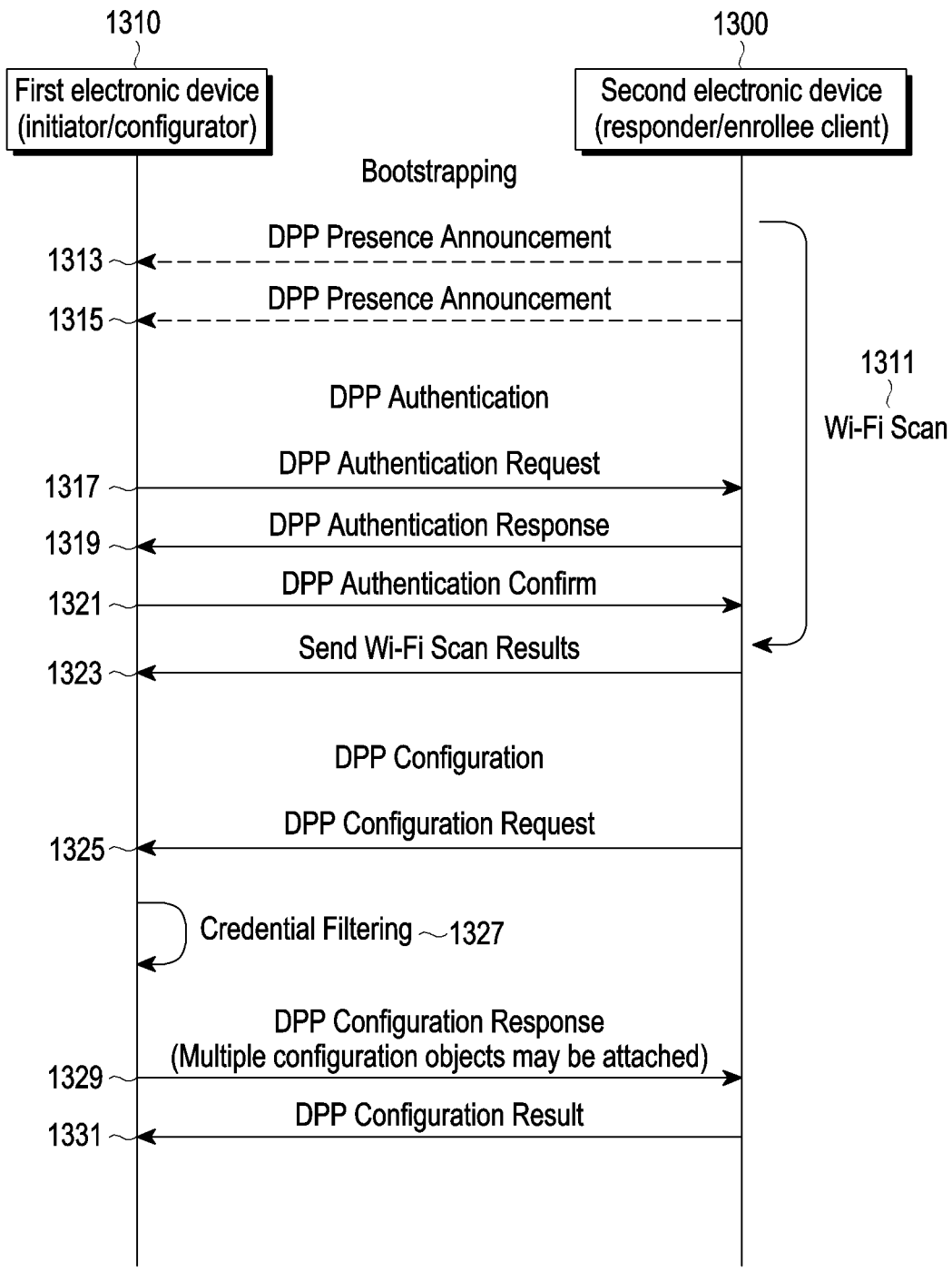
FIG. 13 is a signal flow diagram schematically illustrating an operation for providing a DPP configuration object based on an enrollee based-Wi-Fi scan filtering scheme and a secondary filtering scheme in a DPP network according to an embodiment of the disclosure.

FIG. 13 is a signal flow diagram schematically illustrating an operation for providing a DPP configuration object based on an enrollee based-Wi-Fi scan filtering scheme and a secondary filtering scheme in a DPP network according to an embodiment of the disclosure.

Referring to FIG. 13, each of an electronic device (e.g., a first electronic device 1310) and an external electronic device (e.g., a second electronic device 1300) may be a DPP device, and it will be assumed that the first electronic device 1310 operates as both a configurator and an initiator, and the second electronic device 1300 operates as both an enrollee client registrant and a responder.

In operation 1313, the second electronic device 1300 which operates as both the enrollee client and the responder may transmit a DPP presence announcement frame. In an embodiment of the disclosure, a hash for the DPP presence announcement frame may be SHA256 ("chirp" | $B_R$). In an embodiment of the disclosure, $B_R$ may represent a public bootstrapping key of the second electronic device 1300. In an embodiment of the disclosure, the DPP presence announcement frame may be similar to a DPP presence announcement frame described in FIG. 7. In an embodiment of the disclosure, the second electronic device 1300 may perform a listening operation on a specified channel during a DPP bootstrapping operation. The first electronic device 1310 which operates as both the configurator and the initiator may obtain bootstrapping information from the second electronic device 1300 by using an OOB mechanism, e.g., QR code scan, NFC tap, or BLE exchange. In an embodiment of the disclosure, the bootstrapping information may include a public bootstrapping key ($B_R$), a global operating class channel, and/or a channel list of the second electronic device 1300 for DPP authentication. During the DPP bootstrapping operation, the second electronic device 1300 may selectively announce existence of the second electronic device 1300 to help the first electronic device 1310 to discover the second electronic device 1300. In an embodiment of the disclosure, in operation 1315, the second electronic device 1300 may transmit a DPP presence announcement frame. For example, the second electronic device 1300 may periodically transmit a DPP presence announcement frame.

According to an embodiment of the disclosure, the first electronic device 1310 may start operating on a channel which is based on channel information received during a DPP bootstrapping operation by broadcasting a DPP authentication request frame. For example, the first electronic device 1310 may broadcast the DPP authentication request frame in operation 1317. In an embodiment of the disclosure, the DPP authentication request frame may include SHA256 ($B_R$), SHA256 ($B_I$), $P_I$, and {I-nonce, I-capabilities}$_{k1}$. For example, SHA256 ($B_R$) may represent a SHA256 hash for $B_R$, $B_I$ may represent a public bootstrapping key of the first electronic device 1310, SHA256 ($B_I$) may represent a SHA256 hash for $B_I$, $P_I$ may represent a public protocol key of the first electronic device 1310, I-nonce may represent an initiator nonce attribute, I-capabilities may represent an initiator capabilities attribute, and k1 may represent a first intermediate key. In an embodiment of the disclosure, at least one of a hash for a public bootstrapping key of the second electronic device 1300, the hash for the public bootstrapping key of the first electronic device 1310, the public protocol key of the first electronic device 1310, or the initiator nonce attribute and the initiator capabilities attribute which are encrypted with the first intermediate key included in the DPP authentication request frame may be secure information used in a DPP authentication operation.

According to an embodiment of the disclosure, if the first electronic device 1310 broadcasts DPP authentication request frames and the second electronic device 1300 successfully receives this DPP authentication request frame, the second electronic device 1300 may match H($B_R$) which is a hash function value for $B_R$. In operation 1319, the second electronic device 1300 may transmit, to the first electronic device 1310, a DPP authentication response frame which is a response frame to the DPP authentication request frame. In an embodiment of the disclosure, the DPP authentication response frame may include a DPP status field, SHA256 ($B_R$), [SHA256 ($B_I$)], $P_R$, and {R-nonce, I-nonce, R-capabilities, {R-auth}$_{ke}$}$_{k2}$. For example, $P_R$ may represent a public protocol key of the second electronic device 1300, R-nonce may represent a responder nonce attribute, R-capabilities may represent a responder capabilities attribute, R-auth may represent an authentication tag of the responder, for example, the second electronic device 1300, ke may represent an encryption key, k2 may represent a second intermediary key, and [ ] may represent a value optionally present. For example, [SHA256 ($B_I$)] may be optionally included in the DPP authentication response frame or may be included in the DPP authentication response frame if a specific condition is satisfied. In an embodiment of the disclosure, at least one of the hash for the public bootstrapping key of the second electronic device 1300, the hash for the public bootstrapping key of the first electronic device 1310, the public protocol key of the second electronic device 1300, or the responder nonce attribute, the responder capabilities attribute, and the authentication tag of the responder which are encrypted with the second intermediate key included in the DPP authentication response frame may be secure information used in the DPP authentication operation. The DPP status field has been described in Table 1, so a detailed description thereof will be omitted herein.

In operation 1321, the first electronic device 1310 receiving the DPP authentication response frame from the second electronic device 1300 may transmit a DPP authentication confirm frame to the second electronic device 1300. In an embodiment of the disclosure, the DPP authentication confirm frame may include a DPP status field, SHA256 ($B_R$),

[SHA256 (B$_1$)], and {I-auth}$_{ke}$. In an embodiment of the disclosure, I-auth may represent an authenticating tag of the first electronic device 1310, and ke may represent an encryption key.

Upon receiving the DPP authentication confirmation frame from the first electronic device 1310, the second electronic device 1300 may transmit a Wi-Fi scan result to the first electronic device 1310 in operation 1323. In an embodiment of the disclosure, a time point at which the second electronic device 1300 starts performing a Wi-Fi scan operation may be an arbitrary time point within a time period from before the second electronic device 1300 performs a DPP bootstrapping operation with the first electronic device 1310 to before the second electronic device 1300 transmits a DPP configuration request frame. However, it will be noted that this is only an example, and the time point at which the second electronic device 1300 starts performing the Wi-Fi scan operation is not necessarily limited thereto. As the Wi-Fi scan operation is performed in operation 1311, the second electronic device 1300 may detect a plurality of APs within an AP coverage. In an embodiment of the disclosure, the AP coverage may be a Wi-Fi coverage in which the second electronic device 1300 may detect the APs. In FIG. 13, referring to FIG. 12, it will be assumed that as the second electronic device 1300 performs the Wi-Fi scan operation, for example, ten APs, e.g., a first to tenth APs, are detected within the AP coverage.

In an embodiment of the disclosure, the second electronic device 1300 may transmit the Wi-Fi scan result to the first electronic device 1310 in one of various schemes as described in FIG. 12, and it will be assumed that the Wi-Fi scan result is transmitted through a separate action frame in FIG. 13. In an embodiment of the disclosure, in operation 1323, the enrollee 1300 may transmit, to the first electronic device 1310, an action frame including the Wi-Fi scan result for the ten APs detected in operation 1311.

After transmitting the Wi-Fi scan result, the second electronic device 1300 may transmit a DPP configuration request frame to the first electronic device 1310 in operation 1325. In an embodiment of the disclosure, the DPP configuration request frame may include {E-nonce, configuration attributes}$_{ke}$. In an embodiment of the disclosure, E-nonce may represent an E-nonce attribute, and configuration attributes may represent configuration attribute objects. A configuration attribute object may include at least one of a device name attribute, a Wi-Fi technology attribute, or a network role attribute. In an embodiment of the disclosure, the DPP configuration request frame may be a message for requesting network configuration information, e.g., a DPP configuration object.

Upon receiving the DPP configuration request frame from the second electronic device 1300, the first electronic device 1310 may perform a DPP configuration object filtering operation in operation 1327. In an embodiment of the disclosure, at least one filtering scheme used for the DPP configuration object filtering operation may include at least one of a Wi-Fi scan filtering scheme or a secondary filtering scheme. In an embodiment of the disclosure, the Wi-Fi scan filtering scheme may include at least one of a configurator-based Wi-Fi scan filtering scheme or an enrollee-based Wi-Fi scan filtering scheme. The Wi-Fi scan filtering scheme and the secondary filtering scheme have been described above, so a detailed description thereof will be omitted herein. In an embodiment of the disclosure, in operation 1327, it will be assumed that the first electronic device 1310 performs the DPP configuration object filtering operation by applying the enrollee-based Wi-Fi scan filtering scheme and the secondary filtering scheme as described in FIG. 12.

In an embodiment of the disclosure, the first electronic device 1310 may select at least one AP included in a credential list stored by the first electronic device 1310 based on the Wi-Fi scan result received from the second electronic device 1300. In an embodiment of the disclosure, the first electronic device 1310 may select at least one AP by applying the enrollee-based Wi-Fi scan filtering scheme.

In FIG. 13, referring to FIG. 12, it will be assumed that among the ten APs detected by the second electronic device 1300, six APs, e.g., the first AP to the sixth AP are APs which are enrolled in the first electronic device 1310, and remaining four APs, e.g., the seventh AP to the tenth AP are APs which are not enrolled in the first electronic device 1310. In an embodiment of the disclosure, the first electronic device 1310 may store a secure credential for each of enrolled APs. In an embodiment of the disclosure, the number of APs detected according to the Wi-Fi scan operation of the second electronic device 1300 is 10, and the number of APs which are enrolled in the first electronic device 1310 among them is 6, so the six APs may be selected.

In an embodiment of the disclosure, the first electronic device 1310 may apply the secondary filtering scheme to the six APs selected by applying the enrollee-based Wi-Fi scan filtering scheme to finally select at least one AP for which a DPP configuration object will be provided in operation 1327. Conditions which the secondary filtering scheme may include have been described in FIG. 10, so a detailed description thereof will be omitted herein. In an embodiment of the disclosure, it will be assumed that the first electronic device 1310 finally selects three APs by applying the secondary filtering scheme.

In operation 1329, the first electronic device 1310 may transmit, to the second electronic device 1300, a DPP configuration response frame which is a response to the DPP configuration request frame. In an embodiment of the disclosure, the DPP configuration response frame may include DPP configuration objects for the three selected APs. Accordingly, the DPP configuration response frame may include a DPP status field and {E-nonce, configuration object, configuration object, configuration object}$_{ke}$. Each of the three DPP configuration objects may be JSON-encoded.

In operation 1331, the second electronic device 1300 receiving the DPP configuration response frame may transmit a DPP configuration result frame to the first electronic device 1310. In an embodiment of the disclosure, the DPP configuration result frame may include {DPP Status, E-nonce}$_{ke}$. Although not separately shown in FIG. 13, thereafter, the second electronic device 1300 may select an AP suitable for the second electronic device 1300 by performing a DPP access operation based on the DPP configuration object received through the DPP configuration response frame, and establish a secure connection with the selected AP. In an embodiment of the disclosure, the three DPP configuration objects are received through the DPP configuration response frame, the second electronic device 1300 may select one AP suitable for the second electronic device 1300 based on the three DPP configuration objects, and establish a secure connection with the selected AP. A criterion for the second electronic device 1300 to select an AP with which the second electronic device 1300 will establish a secure connection may be implemented in various forms.

Figure 14:
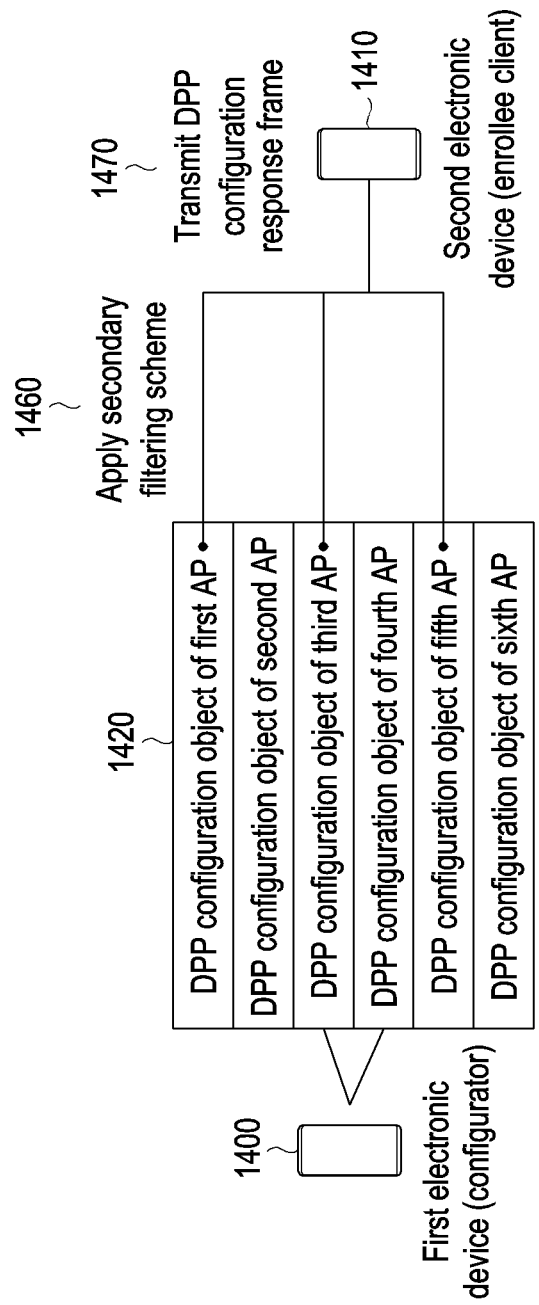
FIG. 14 is a diagram schematically illustrating an operation for providing a DPP configuration object based on a secondary filtering scheme in a DPP network according to an embodiment of the disclosure.

FIG. 14 is a diagram schematically illustrating an operation for providing a DPP configuration object based on a secondary filtering scheme in a DPP network according to an embodiment of the disclosure.

Referring to FIG. 14, the DPP network may include a plurality of electronic devices, e.g., an electronic device, e.g., a first electronic device 1400, and an external electronic device, e.g., a second electronic device 1410. In FIG. 14, each of the first electronic device 1400 and the second electronic device 1410 may be a DPP device, and it will be assumed that the first electronic device 1400 operates as a configurator, and the second electronic device 1410 operates as an enrollee client.

According to an embodiment of the disclosure, in operation 1420, the first electronic device 1400 (e.g., an electronic device 101 in FIG. 1) stores a DPP configuration object for at least one AP. In FIG. 14, it will be assumed that the first electronic device 1400 stores DPP configuration objects for six APs, e.g., a first AP to a sixth AP, and thus stores secure credentials for the first to sixth APs.

According to an embodiment of the disclosure, in operation 1460, if the first electronic device 1400 receives a DPP configuration request frame from an external electronic device (e.g., an electronic device 102 or 104 in FIG. 1), e.g., the second electronic device 1410, the first electronic device 1400 may select at least one AP by applying a secondary filtering scheme to the six APs whose DPP configuration objects are stored in the first electronic device 1400. In an embodiment of the disclosure, the secondary filtering scheme may include at least one of conditions, e.g., a condition 1, a condition 2, a condition 3, a condition 4, a condition 5, a condition 6, a condition 7, a condition 8, or a condition 9 as described in FIG. 10. The conditions 1 to 9 have been described in FIG. 10, so a detailed description thereof will be omitted herein.

According to an embodiment of the disclosure, in operation 1470, the first electronic device 1400 may include a DPP configuration object including a credential object for each of the at least one AP selected by applying the secondary filtering scheme in a DPP configuration response frame, and transmit, to the second electronic device 1410, the DPP configuration response frame including the DPP configuration object for each of the at least one AP.

In an embodiment of the disclosure, the first electronic device 1400 may select the first AP, the third AP, and the fifth AP based on the secondary filtering scheme. The first electronic device 1400 may include a DPP configuration object including a credential object for each of the first AP, the third AP, and the fifth AP in a DPP configuration response frame, and transmit, to the second electronic device 1410, the DPP configuration response frame including the DPP configuration object for each of the first AP, the third AP, and the fifth AP.

Figure 15:
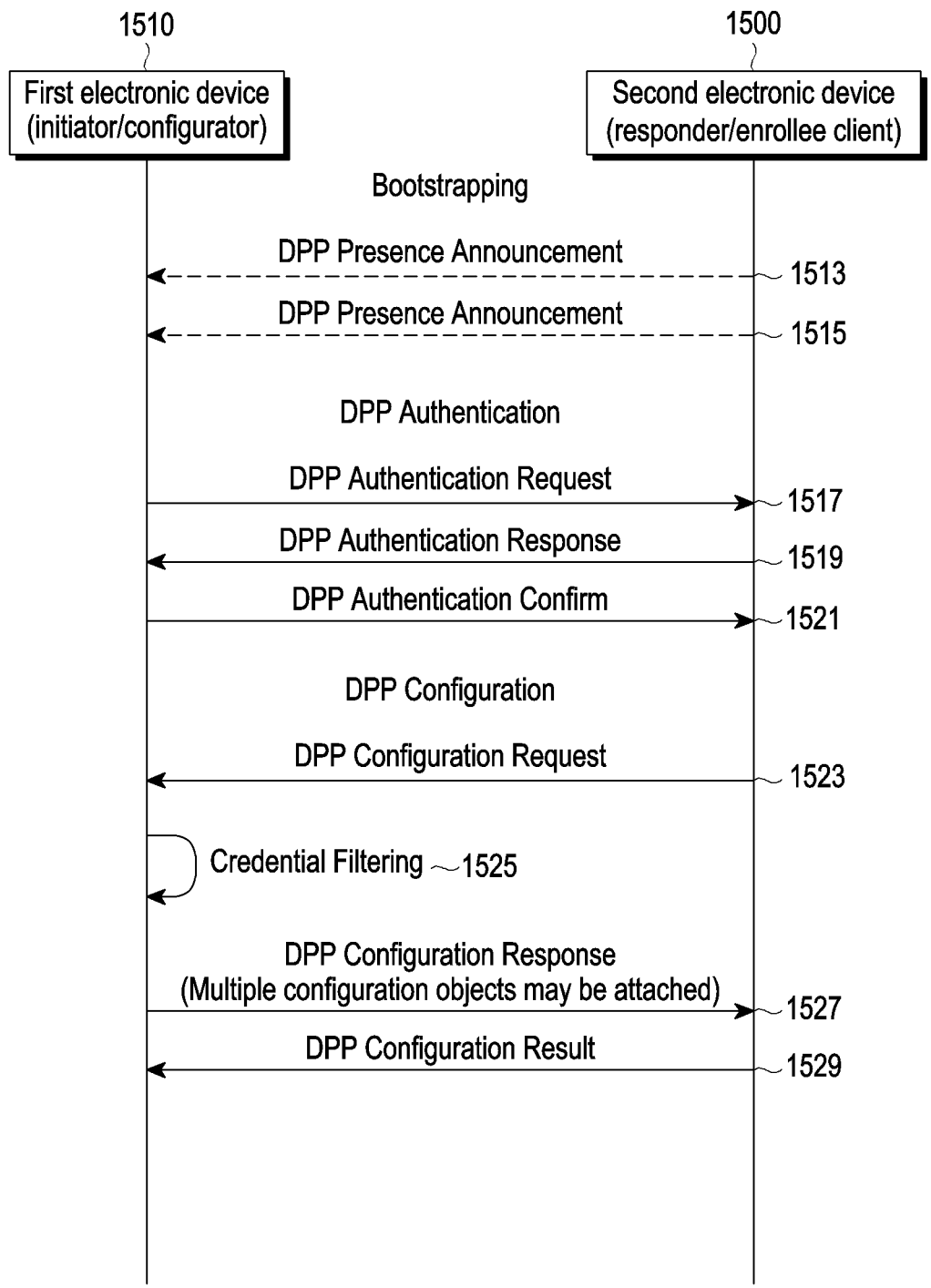
FIG. 15 is a signal flow diagram schematically illustrating an operation for providing a DPP configuration object based on a secondary filtering scheme in a DPP network according to an embodiment of the disclosure.

FIG. 15 is a signal flow diagram schematically illustrating an operation for providing a DPP configuration object based on a secondary filtering scheme in a DPP network according to an embodiment of the disclosure.

Referring to FIG. 15, each of an electronic device (e.g., a first electronic device 1510) and an external electronic device (e.g., a second electronic device 1500) may be a DPP device, and it will be assumed that the first electronic device 1510 operates as both a configurator and an initiator, and the second electronic device 1500 operates as both an enrollee client registrant and a responder.

In operation 1513, the second electronic device 1500 which operates as both the enrollee client and the responder may transmit a DPP presence announcement frame. In an embodiment of the disclosure, a hash for the DPP presence announcement frame may be SHA256 ("chirp" | $B_R$). In an embodiment of the disclosure, $B_R$ may represent a public bootstrapping key of the second electronic device 1500. In an embodiment of the disclosure, the DPP presence announcement frame may be similar to a DPP presence announcement frame described in FIG. 7. In an embodiment of the disclosure, the second electronic device 1500 may perform a listening operation on a specified channel during a DPP bootstrapping operation. The first electronic device 1510 which operates as both the configurator and the initiator may obtain bootstrapping information from the second electronic device 1500 by using an OOB mechanism, e.g., QR code scan, NFC tap, or BLE exchange. In an embodiment of the disclosure, the bootstrapping information may include a public bootstrapping key ($B_R$), a global operating class channel, and/or a channel list of the second electronic device 1500 for DPP authentication. During the DPP bootstrapping operation, the second electronic device 1500 may selectively announce existence of the second electronic device 1500 to help the first electronic device 1510 to discover the second electronic device 1500. In an embodiment of the disclosure, in operation 1515, the second electronic device 1500 may transmit a DPP presence announcement frame. For example, the second electronic device 1500 may periodically transmit a DPP presence announcement frame.

According to an embodiment of the disclosure, the first electronic device 1510 may start operating on a channel which is based on channel information received during a DPP bootstrapping operation by broadcasting a DPP authentication request frame. For example, the first electronic device 1510 may broadcast the DPP authentication request frame in operation 1517. In an embodiment of the disclosure, the DPP authentication request frame may include SHA256 ($B_R$), SHA256 ($B_I$), $P_I$, and {I-nonce, I-capabilities}$_{k1}$. For example, SHA256 ($B_R$) may represent a SHA256 hash for $B_R$, $B_I$ may represent a public bootstrapping key of the first electronic device 1510, SHA256 ($B_I$) may represent a SHA256 hash for $B_I$, $P_I$ may represent a public protocol key of the first electronic device 1510, I-nonce may represent an initiator nonce attribute, I-capabilities may represent an initiator capabilities attribute, and k1 may represent a first intermediate key. In an embodiment of the disclosure, at least one of a hash for a public bootstrapping key of the second electronic device 1500, the hash for the public bootstrapping key of the first electronic device 1510, the public protocol key of the first electronic device 1510, or the initiator nonce attribute and the initiator capabilities attribute which are encrypted with the first intermediate key included in the DPP authentication request frame may be secure information used in a DPP authentication operation.

According to an embodiment of the disclosure, if the first electronic device 1510 broadcasts DPP authentication request frames and the second electronic device 1500 successfully receives this DPP authentication request frame, the second electronic device 1500 may match H($B_R$) which is a hash function value for $B_R$. In operation 1519, the second electronic device 1500 may transmit, to the first electronic device 1510, a DPP authentication response frame which is a response frame to the DPP authentication request frame. In an embodiment of the disclosure, the DPP authentication response frame may include a DPP status field, SHA256 ($B_R$), [SHA256 ($B_I$)], $P_R$, and {R-nonce, I-nonce, R-capabilities, {R-auth}$_{ke}$}$_{k2}$. In an embodiment of the disclosure, $P_R$ may represent a public protocol key of the second electronic device 1500, R-nonce may represent a responder nonce attribute, R-capabilities may represent a responder capabilities attribute, R-auth may represent an authentication tag of the responder, for example, the second electronic device 1500, ke may represent an encryption key, k2 may represent a second intermediary key, and [ ] may represent a value optionally present. For example, [SHA256 ($B_I$)] may be optionally included in the DPP authentication response frame or may be included in the DPP authentication response frame if a specific condition is satisfied. In an embodiment of the disclosure, at least one of the hash for the public bootstrapping key of the second electronic device 1500, the hash for the public bootstrapping key of the first electronic device 1510, the public protocol key of the second electronic device 1500, or the responder nonce attribute, the responder capabilities attribute, and the authentication tag of the responder which are encrypted with the second intermediate key included in the DPP authentication response frame may be secure information used in the DPP authentication operation. The DPP status field has been described in Table 1, so a detailed description thereof will be omitted herein.

In operation 1521, the first electronic device 1510 receiving the DPP authentication response frame from the second electronic device 1500 may transmit a DPP authentication confirm frame to the second electronic device 1500. In an embodiment of the disclosure, the DPP authentication confirm frame may include a DPP status field, SHA256 ($B_R$), [SHA256 ($B_I$)], and {I-auth}$_{ke}$. In an embodiment of the disclosure, I-auth may represent an authenticating tag of the first electronic device 1510, and ke may represent an encryption key.

In operation 1523, the second electronic device 1500 receiving the DPP authentication confirm frame from the first electronic device 1510 may transmit a DPP configuration request frame to the first electronic device 1510. In an embodiment of the disclosure, the DPP configuration request frame may include {E-nonce, configuration attributes}$_{ke}$. In an embodiment of the disclosure, E-nonce may represent an E-nonce attribute, and configuration attributes may represent configuration attribute objects. A configuration attribute object may include at least one of a device name attribute, a Wi-Fi technology attribute, or a network role attribute. In an embodiment of the disclosure, the DPP configuration request frame may be a message for requesting network configuration information, e.g., a DPP configuration object.

Upon receiving the DPP configuration request frame from the second electronic device 1500, the first electronic device 1510 may perform a DPP configuration object filtering operation in operation 1525. In an embodiment of the disclosure, the DPP configuration object filtering operation may mean an operation of selecting at least one DPP configuration object by applying set at least one filtering scheme to at least one DPP configuration object stored in the configurator. In an embodiment of the disclosure, the at least one filtering scheme used in the DPP configuration object filtering operation may include a secondary filtering scheme. The secondary filtering scheme has been described above, so a detailed description thereof will be omitted herein. In an embodiment of the disclosure, in operation 1525, it will be assumed that the first electronic device 1510 performs the DPP configuration object filtering operation by applying the secondary filtering scheme as described in FIG. 14.

In an embodiment of the disclosure, the first electronic device 1510 may apply the secondary filtering scheme to six APs, e.g., a first AP to a sixth AP, whose DPP configuration objects are stored in the first electronic device 1510 to finally select at least one AP for which a DPP configuration object will be provided in operation 1525. Conditions which the secondary filtering scheme may include have been described in FIG. 10, so a detailed description thereof will be omitted herein. In an embodiment of the disclosure, it will be assumed that the first electronic device 1510 finally selects three APs by applying the secondary filtering scheme.

In operation 1527, the first electronic device 1510 may transmit, to the second electronic device 1500, a DPP configuration response frame which is a response to the DPP configuration request frame. In an embodiment of the disclosure, the DPP configuration response frame may include DPP configuration objects for the three selected APs. Accordingly, the DPP configuration response frame may include a DPP status field and {E-nonce, configuration object, configuration object, configuration object}$_{ke}$. Each of the three DPP configuration objects may be JSON-encoded.

In operation 1529, the second electronic device 1500 receiving the DPP configuration response frame may transmit a DPP configuration result frame to the first electronic device 1510. In an embodiment of the disclosure, the DPP configuration result frame may include {DPP Status, E-nonce}$_{ke}$. Although not separately shown in FIG. 15, thereafter, the second electronic device 1500 may select an AP suitable for the second electronic device 1500 by performing a DPP access operation based on the DPP configuration object received through the DPP configuration response frame, and establish a secure connection with the selected AP. In an embodiment of the disclosure, the three DPP configuration objects are received through the DPP configuration response frame, the second electronic device 1500 may select one AP suitable for the second electronic device 1500 based on the three DPP configuration objects, and establish a secure connection with the selected AP. A criterion for the second electronic device 1500 to select an AP with which the second electronic device 1500 will establish a secure connection may be implemented in various forms.

Various embodiments may provide an electronic device for transmitting and receiving network configuration information and an operating method thereof in a DPP network.

Various embodiments may provide an electronic device for transmitting and receiving a plurality of network configuration information and an operating method thereof in a DPP network.

Various embodiments may provide an electronic device for transmitting and receiving network configuration information suitable for an enrollee and an operating method thereof in a DPP network.

Various embodiments may provide an electronic device for providing a condition for filtering network configuration information to be provided and an operating method thereof in a DPP network.

Various embodiments may provide an electronic device for providing a plurality of DPP configuration objects based on set conditions and an operating method thereof in a DPP network.

According to various embodiments of the disclosure, a method performed by an electronic device (e.g., an electronic device 101 in FIG. 1) may comprise: receiving, from an external electronic device (e.g., an electronic device 102 or an electronic device 104 in FIG. 1), a first message requesting network configuration information, selecting at least one network configuration information to be transmitted to the external electronic device 101 or 102 among a plurality of network configuration information stored in the electronic device 101 based on a set filtering scheme, and transmitting, to the external electronic device 102 or 104, a second message including the selected at least one network configuration information.

According to various embodiments of the disclosure, the filtering scheme may include at least one of a filtering scheme which is based on a scan result of the electronic device 101, or a filtering scheme which is based on a scan result of the external electronic device 102 or 104. In an embodiment of the disclosure, the filtering scheme which is based on the scan result of the electronic device 101 may be a configurator-based Wi-Fi scan filtering scheme, and the filtering scheme which is based on the scan result of the external electronic device 102 or 104 may be an enrollee-based Wi-Fi scan filtering scheme.

According to various embodiments of the disclosure, the filtering scheme may include at least one of a filtering scheme which is based on a scan result of the electronic device 101, a filtering scheme which is based on a scan result of the external electronic device 102 or 104, or a secondary filtering scheme including at least one filtering condition.

According to various embodiments of the disclosure, if the filtering scheme is a filtering scheme which is based on a scan result of the electronic device 101, selecting the at least one network configuration information to be transmitted to the external electronic device 102 or 104 may comprise: detecting other external electronic devices (an electronic device 102 or an electronic device 104 in FIG. 1) by performing a scan operation, selecting at least one other external electronic device 102 or 104 enrolled in the electronic device 101 among the detected other external electronic devices 102 or 104, and selecting, as the network configuration information to be transmitted to the external electronic device 102 or 104, network configuration information which corresponds to the at least one other external electronic device 102 or 104 enrolled in the electronic device 101 among the plurality of network configuration information stored in the electronic device 101.

According to various embodiments of the disclosure, if the filtering scheme is a filtering scheme which is based on a scan result of the external electronic device 102 or 104, selecting the at least one network configuration information to be transmitted to the external electronic device 102 or 104 may comprise: receiving the scan result of the external electronic device 102 or 104 from the external electronic device 102 or 104, identifying other external electronic devices 102 or 104 based on the scan result of the external electronic device 102 or 104, selecting at least one other external electronic device 102 or 104 enrolled in the electronic device 101 among the identified other external electronic devices 102 or 104, and selecting, as the network configuration information to be transmitted to the external electronic device 102 or 104, network configuration information which corresponds to the at least one other external electronic device 102 or 104 enrolled in the electronic device 101 among the plurality of network configuration information stored in the electronic device 101.

According to various embodiments of the disclosure, if the filtering scheme is a secondary filtering scheme including at least one filtering condition, selecting the at least one network configuration information to be transmitted to the external electronic device 102 or 104 may comprise: selecting, as the network configuration information to be transmitted to the external electronic device 102 or 104, at least one network configuration information which satisfies the at least one filtering condition among the plurality of network configuration information stored in the electronic device 101.

According to various embodiments of the disclosure, the at least one filtering condition includes at least one of: a first condition for selecting, as the network configuration information to be transmitted to the external electronic device 102 or 104, network configuration information which corresponds to at least one other external electronic device 102 or 104 to which the secondary filtering scheme is applied among other external electronic devices 102 or 104 which correspond to the plurality of network configuration information stored in the electronic device 101, a second condition for selecting, as the network configuration information to be transmitted to the external electronic device 102 or 104, network configuration information which corresponds to at least one other external electronic device 102 or 104 having a record of access by the electronic device 101 within a set period among the other external electronic devices 102 or 104 which correspond to the plurality of network configuration information stored in the electronic device 101, a third condition for selecting, as the network configuration information to be transmitted to the external electronic device 102 or 104, network configuration information which corresponds to at least one other external electronic device 102 or 104 existing within a set distance from the electronic device 101 among the other external electronic devices 102 or 104 which correspond to the plurality of network configuration information stored in the electronic device 101, a fourth condition for selecting, as the network configuration information to be transmitted to the external electronic device 102 or 104, network configuration information which corresponds to at least one other external electronic device 102 or 104 selected through an upper layer among the other external electronic devices 102 or 104 which correspond to the plurality of network configuration information stored in the electronic device 101, a fifth condition for selecting, as the network configuration information to be transmitted to the external electronic device 102 or 104, network configuration information which corresponds to at least one other external electronic device 102 or 104 whose channel quality is equal to or greater than threshold channel quality among the other external electronic devices 102 or 104 which correspond to the plurality of network configuration information stored in the electronic device 101, a sixth condition for selecting, as the network configuration information to be transmitted to the external electronic device 102 or 104, network configuration information which corresponds to at least one other external electronic device 102 or 104 which is selected based on network quality among the other external electronic devices 102 or 104 which correspond to the plurality of network configuration information stored in the electronic device 101, a seventh condition for selecting, as the network configuration information to be transmitted to the external electronic device 102 or 104, network configuration information which corresponds to at least one other external electronic device 102 or 104 which exists within a set distance from the electronic device 101 and has a record of access by the electronic device 101 within a set period among the other external electronic devices 102 or 104 which correspond to the plurality of network configuration information stored in the electronic device 101, or an eighth condition for selecting, as the network configuration information to be transmitted to the external electronic device 102 or 104, network configuration information which corresponds to at least one other external electronic device 102 or 104 which exists within a set distance from the electronic device 101 and which is selected through an upper layer among the other external electronic devices 102 or 104 which correspond to the plurality of network configuration information stored in the electronic device 101.

According to various embodiments of the disclosure, the method may further comprise: performing an authentication operation with the external electronic device 102 or 104 based on secure information. In an embodiment of the disclosure, the authentication operation may include an operation of transmitting and receiving a DPP authentication request frame and a DPP authentication response frame between the electronic device 101 and the external electronic device 102 or 104. In an embodiment of the disclosure, at least one of a hash for a public bootstrapping key of a responder, a hash for a public bootstrapping key of an initiator, a public protocol key of the initiator, or initiator nonce attribute and an initiator capabilities attribute which are encrypted with a first intermediate key included in the DPP authentication request frame may be secure information used in an authentication operation, e.g., a DPP authentication operation. In an embodiment of the disclosure, at least one of the hash for the public bootstrapping key of the responder, the hash for the public bootstrapping key of the initiator, a public bootstrapping key of the responder, or a responder nonce attribute, a responder capabilities attribute, and an initiator capabilities attribute which are encrypted with a second intermediate key included in the DPP authentication response frame may be secure information used in the authentication operation, e.g., the DPP authentication operation.

According to various embodiments of the disclosure, a method performed by an electronic device (e.g., an electronic device 101 in FIG. 1) may comprise: performing an authentication operation based on secure information with an external electronic device (e.g., an electronic device 102 or an electronic device 104 in FIG. 1), transmitting, to the external electronic device 102 or 104, a first message requesting network configuration information, and receiving, from the external electronic device 102 or 104, a second message including at least one network configuration information which is selected among a plurality of network configuration information stored in the external electronic device 102 or 104 based on a set filtering scheme.

According to various embodiments of the disclosure, the filtering scheme may include at least one of a filtering scheme which is based on a scan result of the external electronic device 102 or 104, a filtering scheme which is based on a scan result of the electronic device 101, or a secondary filtering scheme including at least one filtering condition. In an embodiment of the disclosure, the filtering scheme which is based on the scan result of the external electronic device 102 or 104 may be a configurator-based Wi-Fi scan filtering scheme, and the filtering scheme which is based on the scan result of the electronic device 101 may be an enrollee-based Wi-Fi scan filtering scheme.

According to various embodiments of the disclosure, if the filtering scheme is a filtering scheme which is based on a scan result of the electronic device 101, the method further comprising: transmitting the scan result of the electronic device 101 to the external electronic device 102 or 104, and the at least one network configuration information included in the second message may be network configuration information which corresponds to at least one other external electronic device 102 or 104 enrolled in the external electronic device 102 or 104 among other external electronic devices (e.g., an electronic device 102 or an electronic device 104 in FIG. 1) which correspond to the scan result among the plurality of network configuration information stored in the external electronic device 102 or 104.

According to various embodiments of the disclosure, if the filtering scheme is a filtering scheme which is based on a scan result of the external electronic device 102 or 104, the at least one network configuration information included in the second message may be network configuration information which corresponds to at least one other external electronic device 102 or 104 enrolled in the external electronic device 102 or 104 among other external electronic devices 102 or 104 which are identified based on the scan result of the external electronic device 102 or 104 among the plurality of network configuration information stored in the external electronic device 102 or 104.

Certain examples of the present disclosure provide a computer program comprising instructions which, when the program is executed by a computer or processor, cause the computer or processor to carry out a method according to any example, embodiment, aspect and/or claim disclosed herein.

Certain examples of the present disclosure provide a computer or processor-readable data carrier having stored thereon a computer program according to the preceding example.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a communication circuit;
at least one processor comprising processing circuitry; and
memory storing executable instructions,
wherein the instructions, when executed by the at least one processor individually or collectively, cause the electronic device to:
  receive, from an external electronic device via the communication circuit, a first message requesting network configuration information,
  select at least two pieces of network configuration information to be transmitted to the external electronic device among a plurality of pieces of network configuration information stored in the electronic device based on a specified filtering scheme, and
  transmit, to the external electronic device via the communication circuit, a second message including the selected at least two pieces of network configuration information, and
wherein the filtering scheme comprises a filtering scheme including at least one filtering condition, the filtering scheme comprising:
  a first condition for selecting, as the network configuration information to be transmitted to the external electronic device, network configuration information which corresponds to at least two other external electronic devices selected through an upper layer among other external electronic devices which correspond to the plurality of pieces of network configuration information stored in the electronic device, the upper layer comprising an application layer, and
wherein the two pieces of network configuration information include a first piece of network configuration information providing access to a first one of the two other external electronic devices and a second piece of network configuration information providing access to a second one of the two other external electronic devices.

2. The electronic device of claim 1, wherein the filtering scheme includes at least one of a filtering scheme which is based on a scan result of the electronic device, or a filtering scheme which is based on a scan result of the external electronic device.

3. The electronic device of claim 1, wherein the filtering scheme includes at least one of a filtering scheme which is based on a scan result of the electronic device or a filtering scheme which is based on a scan result of the external electronic device.

4. The electronic device of claim 1, wherein the executable instructions further include executable instructions that, when executed by the at least one processor individually or collectively further cause the electronic device, in response to the filtering scheme being a filtering scheme which is based on a scan result of the electronic device, to:
- detect other external electronic devices by performing, via the communication circuit, a scan operation,
- select at least one other external electronic device enrolled in the electronic device among the detected other external electronic devices, and
- select, as the at least two pieces of network configuration information to be transmitted to the external electronic device, network configuration information which corresponds to the at least two other external electronic device-devices enrolled in the electronic device among the plurality of pieces of network configuration information stored in the electronic device.

5. The electronic device of claim 1, wherein the executable instructions further include executable instructions that, when executed by the at least one processor individually or collectively further cause the electronic device, in response to the filtering scheme being a filtering scheme which is based on a scan result of the external electronic device, to:
- receive, via the communication circuit, the scan result from the external electronic device,
- identify other external electronic devices based on the scan result of the external electronic device,
- select at least one other external electronic device enrolled in the electronic device among the identified other external electronic devices, and
- select, as the at least two pieces of network configuration information to be transmitted to the external electronic device, network configuration information which corresponds to the at least two other external electronic devices enrolled in the electronic device among the plurality of pieces of network configuration information stored in the electronic device.

6. The electronic device of claim 1, wherein the executable instructions further include executable instructions that, when executed by the at least one processor individually or collectively further cause the electronic device to:
- select, as the at least two pieces of network configuration information to be transmitted to the external electronic device, at least two network configuration information which satisfies the at least one filtering condition among the plurality of pieces of network configuration information stored in the electronic device.

7. The electronic device of claim 6, wherein the at least one filtering condition includes at least one of:
- a second condition for selecting, as the at least two pieces of network configuration information to be transmitted to the external electronic device, network configuration information which corresponds to at least two other external electronic devices to which the filtering scheme is applied among other external electronic devices which correspond to the plurality of pieces of network configuration information stored in the electronic device;
- a third condition for selecting, as the at least two pieces of network configuration information to be transmitted to the external electronic device, network configuration information which corresponds to at least two other external electronic devices existing within a set distance from the electronic device among the other external electronic devices which correspond to the plurality of pieces of network configuration information stored in the electronic device;
- a fourth condition for selecting, as the at least two pieces of network configuration information to be transmitted to the external electronic device, network configuration information which corresponds to at least two other external electronic devices whose channel quality is equal to or greater than threshold channel quality among the other external electronic devices which correspond to the plurality of pieces of network configuration information stored in the electronic device;
- a fifth condition for selecting, as the at least two pieces of network configuration information to be transmitted to the external electronic device, network configuration information which corresponds to at least two other external electronic devices which are selected based on network quality among the other external electronic devices which correspond to the plurality of pieces of network configuration information stored in the electronic device;
- a sixth condition for selecting, as the at least two pieces of network configuration information to be transmitted to the external electronic device, network configuration information which corresponds to at least two other external electronic devices which exist within a set distance from the electronic device and have a record of access by the electronic device within a set period among the other external electronic devices which correspond to the plurality of pieces of network configuration information stored in the electronic device: or
- a seventh condition for selecting, as the at least two pieces of network configuration information to be transmitted to the external electronic device, network configuration information which corresponds to at least two other external electronic devices which exist within a set distance from the electronic device and which are selected through an upper layer among the other external electronic devices which correspond to the plurality of pieces of network configuration information stored in the electronic device.

8. The electronic device of claim 1, wherein the executable instructions further include executable instructions that, when executed by the at least one processor individually or collectively further cause the electronic device to:
- perform, via the communication circuit, an authentication operation with the external electronic device based on secure information.

9. The electronic device of claim 1, wherein the two pieces of network configuration information include a first configuration object and a second configuration object, the first configuration object being different from the second configuration object.

10. The electronic device of claim 9, wherein each of the configuration objects is JSON-encoded.

11. A method performed by an electronic device, the method comprising:
- receiving, from an external electronic device, a first message requesting network configuration information;

selecting at least two pieces of network configuration information to be transmitted to the external electronic device among a plurality of pieces of network configuration information stored in the electronic device based on a specified filtering scheme; and transmitting, to the external electronic device, a second message including the selected at least two pieces of network configuration information, wherein the filtering scheme comprises a filtering scheme including at least one filtering condition, the filtering scheme comprising:

a first condition for selecting, as the network configuration information to be transmitted to the external electronic device, network configuration information which corresponds to at least two other external electronic devices selected through an upper layer among the other external electronic devices which correspond to the plurality of pieces of network configuration information stored in the electronic device, the upper layer comprising an application layer, and wherein the two pieces of network configuration information include a first piece of network configuration information providing access to a first one of the two other external electronic devices and a second piece of network configuration information providing access to a second one of the two other external electronic devices.

12. The method of claim 11, wherein the filtering scheme includes at least one of a filtering scheme which is based on a scan result of the electronic device, or a filtering scheme which is based on a scan result of the external electronic device.

13. The method of claim 11, wherein the filtering scheme includes at least one of a filtering scheme which is based on a scan result of the electronic device or a filtering scheme which is based on a scan result of the external electronic device.

14. The method of claim 11, wherein, in response to the filtering scheme being a filtering scheme which is based on a scan result of the electronic device, selecting the at least two pieces of network configuration information to be transmitted to the external electronic device comprises:

detecting other external electronic devices by performing a scan operation;

selecting at least one other external electronic device enrolled in the electronic device among the detected other external electronic devices; and selecting, as the network configuration information to be transmitted to the external electronic device, network configuration information which corresponds to the at least one other external electronic device enrolled in the electronic device among the plurality of pieces of network configuration information stored in the electronic device.

15. The method of claim 11, wherein, in response to the filtering scheme being a filtering scheme which is based on a scan result of the external electronic device, selecting the at least two pieces of network configuration information to be transmitted to the external electronic device comprises:

receiving the scan result from the external electronic device;

identifying other external electronic devices based on the scan result of the external electronic device;

selecting at least one other external electronic device enrolled in the electronic device among the identified other external electronic devices; and selecting, as the network configuration information to be transmitted to the external electronic device, network configuration information which corresponds to the at least one other external electronic device enrolled in the electronic device among the plurality of pieces of network configuration information stored in the electronic device.

16. The method of claim 11, wherein, in response to the filtering scheme being a filtering scheme including at least one filtering condition, selecting the at least two pieces of network configuration information to be transmitted to the external electronic device comprises:

selecting, as the network configuration information to be transmitted to the external electronic device, at least one network configuration information which satisfies the at least one filtering condition among the plurality of pieces of network configuration information stored in the electronic device.

17. The method of claim 16, wherein the at least one filtering condition includes at least one of:

a second condition for selecting, as the network configuration information to be transmitted to the external electronic device, network configuration information which corresponds to at least one other external electronic device to which the filtering scheme is applied among other external electronic devices which correspond to the plurality of pieces of network configuration information stored in the electronic device;

a third condition for selecting, as the network configuration information to be transmitted to the external electronic device, network configuration information which corresponds to at least one other external electronic device existing within a set distance from the electronic device among the other external electronic devices which correspond to the plurality of pieces of network configuration information stored in the electronic device;

a fourth condition for selecting, as the network configuration information to be transmitted to the external electronic device, network configuration information which corresponds to at least one other external electronic device whose channel quality is equal to or greater than threshold channel quality among the other external electronic devices which correspond to the plurality of pieces of network configuration information stored in the electronic device;

a fifth condition for selecting, as the network configuration information to be transmitted to the external electronic device, network configuration information which corresponds to at least one other external electronic device which is selected based on network quality among the other external electronic devices which correspond to the plurality of pieces of network configuration information stored in the electronic device;

a sixth condition for selecting, as the network configuration information to be transmitted to the external electronic device, network configuration information which corresponds to at least one other external electronic device which exists within a set distance from the electronic device and has a record of access by the electronic device within a set period among the other external electronic devices which correspond to the plurality of pieces of network configuration information stored in the electronic device; or a seventh condition for selecting, as the network configuration information to be transmitted to the external electronic device, network configuration information which corresponds to at least one other external electronic device which exists within a set distance from the electronic device and which is selected through an upper layer among the other external electronic devices which correspond to the plurality of pieces of network configuration information stored in the electronic device.

18. The method of claim 11, further comprising:
performing an authentication operation with the external electronic device based on secure information.

* * * * *